United States Patent
Granson et al.

(10) Patent No.: US 11,816,539 B1
(45) Date of Patent: Nov. 14, 2023

(54) SELECTION SYSTEM FOR MACHINE LEARNING MODULE FOR DETERMINING TARGET METRICS FOR EVALUATION OF HEALTH CARE PROCEDURES AND PROVIDERS

(71) Applicant: SurgeonCheck LLC, Bethlehem, PA (US)

(72) Inventors: Marc Granson, Bethlehem, PA (US); Jennifer Shields, Coopersburg, PA (US); Thomas A. Woolman, Amissville, VA (US)

(73) Assignee: SurgeonCheck LLC, Bethlehem, PA (US)

( * ) Notice: Subject to any disclaimer, the term of this patent is extended or adjusted under 35 U.S.C. 154(b) by 895 days.

(21) Appl. No.: 15/469,149

(22) Filed: Mar. 24, 2017

Related U.S. Application Data

(60) Provisional application No. 62/350,073, filed on Jun. 14, 2016.

(51) Int. Cl.
  *G06N 20/00* (2019.01)
  *G06F 16/22* (2019.01)

(52) U.S. Cl.
  CPC .................. *G06N 20/00* (2019.01); *G06F 16/22* (2019.01)

(58) Field of Classification Search
  CPC .................. G06N 20/00; G06F 16/22
  See application file for complete search history.

(56) References Cited

U.S. PATENT DOCUMENTS

| | | | | |
|---|---|---|---|---|
| 7,698,235 B2* | 4/2010 | Kuroiwa | ............... | G06N 20/00 706/12 |
| 8,548,828 B1* | 10/2013 | Longmire | .............. | G06Q 10/10 705/3 |
| 9,424,532 B1* | 8/2016 | Abedini et al. | ....... | G06F 16/951 |
| 9,495,515 B1* | 11/2016 | Kennedy et al. | ....... | G16B 40/00 |
| 2004/0242972 A1* | 12/2004 | Adak et al. | ............ | G16H 50/70 128/920 |

(Continued)

OTHER PUBLICATIONS

B.B. Misra, "Functional Link Artificial Neural Network for Classification Task in Data Mining" (Year: 2007).*
Dridi, "An Enhencment Medical Image Compression Algorithm Based on Neural Network" (Year: 2016).*
Narimani, A New Hybrid Model for Improvement of ARIMA by DEA (Year: 2012).*

(Continued)

*Primary Examiner* — Abdullah Al Kawsar
*Assistant Examiner* — Tewodros E Mengistu
(74) *Attorney, Agent, or Firm* — NIXON PEABODY LLP

(57) ABSTRACT

A method and system to determine a rating for evaluation of a health care procedure is disclosed. The system includes a user interface accepting a request for a rating of the health care procedure. A database includes input data metrics each related to one of health care provider quality metrics, health care provider cost metrics, health care facility quality metrics, and health care facility quality metrics. A machine learning system is trained to provide a rating target value for the health care procedure based on the neural processing of the data factors. The system evaluates a number of machine learning algorithms to determine the best learning algorithm for a particular rating target value based on test data supplied to the machine learning algorithms. The best learning algorithm for the particular rating target value is used by the system to determine the rating for evaluation.

16 Claims, 12 Drawing Sheets

(56) References Cited

U.S. PATENT DOCUMENTS

| | | | | |
|---|---|---|---|---|
| 2006/0253296 | A1* | 11/2006 | Liisberg et al. | G06F 19/3481 |
| | | | | 705/2 |
| 2010/0082367 | A1 | 4/2010 | Hains et al. | |
| 2011/0119072 | A1 | 5/2011 | Lipner et al. | |
| 2016/0358099 | A1* | 12/2016 | Sturlaugson et al. | G06N 5/043 |
| 2017/0357760 | A1* | 12/2017 | Han et al. | G16Z 99/00 |
| 2018/0101533 | A1* | 4/2018 | Robichaud | G06F 16/24578 |

OTHER PUBLICATIONS

Porter, M.E., Ph.D., "Measuring Health Outcomes: The Outcome Hierarchy," New England Journal of Medicine, 2010 Volume 363, Pages 2477-81 (19 pages).

Porter, M.E. et al., "The Strategy That Will Fix Healthcare," Harvard Business Review, Oct. 2013, Pages 1-19.

Tam, Artificial neural networks model for predicting excavator (Year: 2002).*

* cited by examiner

Fit Statistics

| Selected Model | Predecessor Node | Model Node | Model Description | Target Variable | T | Selection Criterion: Train: Average Square Error | Train: Akaike's Information Criterion | Train: Average Squared Error | Train: Average Error Function | Train: Degrees of Freedom for Error | Train: Model Degrees of Freedom | Train: Total Degrees of Freedom | Train: Divisor for ASE | Train: Error Function | Train: Final Prediction Error | Train: Maximum Absolute Error |
|---|---|---|---|---|---|---|---|---|---|---|---|---|---|---|---|---|
| Y | AutoNeural | AutoNeural | AutoNeural | ProviderMetricsNumCalculated13 | | 1.528949 | | 1.528949 | 1.528949 | -25 | 49 | 24 | 24 | 35.69479 | | 4.54375 |
| | Neural | Neural | Neural | ProviderMetricsNumCalculated13 | | 5.99172 | | 5.99172 | 5.99172 | -13 | 37 | 24 | 24 | 143.8013 | | 5.866725 |
| | DMNeural | DMNeural | Neural Net. | ProviderMetricsNumCalculated13 | | 65.42835 | 142.3429 | 65.42835 | 65.42835 | 3 | 3 | 24 | 24 | 1570.28 | 981.4252 | 17.81802 |
| | PLS | PLS | Partial Lea. | ProviderMetricsNumCalculated13 | | 86.48465 | | 86.48465 | 86.48465 | | | 24 | 24 | | | 21.67053 |
| | LARS | LARS | LARS | ProviderMetricsNumCalculated13 | | 86.48465 | | 86.48465 | 86.48465 | | | 24 | 24 | | | 21.67053 |
| | Reg | Reg | Regression | ProviderMetricsNumCalculated13 | | 86.48465 | 129.0392 | 86.48465 | 86.48465 | 13 | 11 | 24 | 24 | 2075.635 | 232.8433 | 21.87053 |
| | Boost | Boost | Gradient Bo | ProviderMetricsNumCalculated13 | | 100.3978 | | 100.3978 | | | | 24 | 24 | | | 27.78146 |
| | Tree | Tree | Decision Tr. | ProviderMetricsNumCalculated13 | | 669.2257 | | 669.2257 | | | | 24 | 24 | | | 78.79714 |
| | MBR | MBR | MBR | ProviderMetricsNumCalculated13 | | 1266.935 | 141.454 | 1266.935 | 1266.935 | 7 | 10 | 17 | 17 | 21537.89 | 4886.748 | 106.8435 |

FIG. 11A

| Train: Mean Square Error | Train: Sum of Frequencies | Train: Number of Estimate Weights | Train: root Average Sum of Squares | Train Root Final Prediction Error | Train: Root Mean Squared Error | Train: Schwarz's Bayesian Criterion | Train: Sum of Square Errors | Train: Sum Of Case Weights Times Freq | Train: Misclassification Rate | Train: Number of Wrong Classifications |
|---|---|---|---|---|---|---|---|---|---|---|
| . | . | 24 | 49 | 1.236507 | . | . | . | 33.69479 | 24 | . |
| . | . | 24 | 37 | 2.447799 | . | . | . | 143.8013 | 24 | . |
| 523..4266 | . | 24 | 21 | 8.088779 | 31.32771 | 22.87652 | 167.0821 | 1570.28 | . | . |
| . | . | 24 | . | 9.299712 | . | . | . | 2075.632 | . | . |
| . | . | 24 | . | 9.299712 | . | . | . | 2075.632 | . | . |
| 159.664 | . | 24 | 11 | 9.299712 | 15.2592 | 12.63582 | 141.9978 | 2075.632 | 24 | . |
| . | . | 24 | . | 10.01967 | . | . | . | 2409.546 | . | . |
| . | . | 24 | . | 25.8694 | . | . | . | 16061.42 | 24 | . |
| 3076.841 | . | 17 | 10 | 35.59402 | 55.46928 | 69.90528 | 149.7862 | 21537.89 | 17 | . |

FIG. 11B

| Provider ID | Metric Example: Minimum Case Volume per Provider per Year | Observation Ranking Based on the Distance to the Probe (1: closest, 5: farthest) |
|---|---|---|
| 7 | 14 | 3 |
| 12 | 17 | 2 |
| 35 | 9 | 5 |
| 108 | 22 | 1 |
| 334 | 35 | 4 |

FIG. 12A

| k | Provider ID of Nearest Neighbor | Target Value of Nearest Neighbor | Posterior Probabilities of the Probe |
|---|---|---|---|
| 1 | 108 | 22 | Prob(High Quality) = 100%, Prob(Low Quality)=0%. This defines the start of the High Quality range for the Metric Target |
| 2 | 108,12 | 22,17 | Prob(High Quality)=50%, Prob(Low Quality)=50%. This Defines The Mid-Point range for the Metric Target |
| 3 | 108,12,7 | 22,17,14 | Prob(High Quality)=67%, Prob(Low Quality)=33% |
| 4 | 108,12,7,334 | 22,17,14,35 | Prob(High Quality)=50%, Prob(Low Quality)=50% |
| 5 | 108,12,7,334,35 | 22,17,14,35,9 | Prob(High Quality)=60%, Prob(Low Quality)=40% |

FIG. 12B

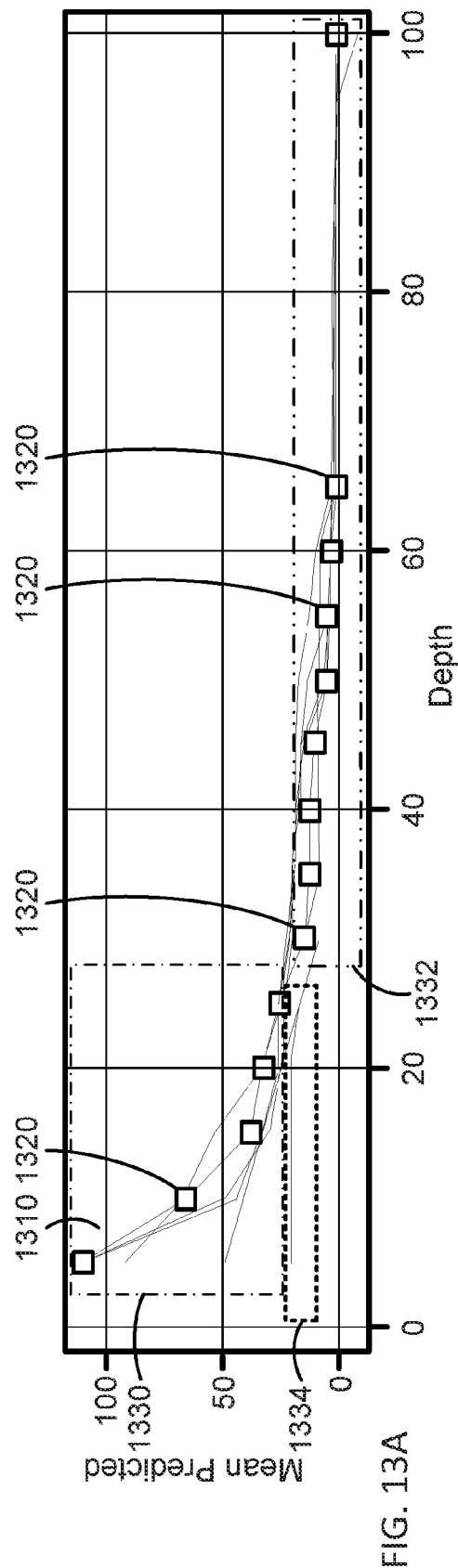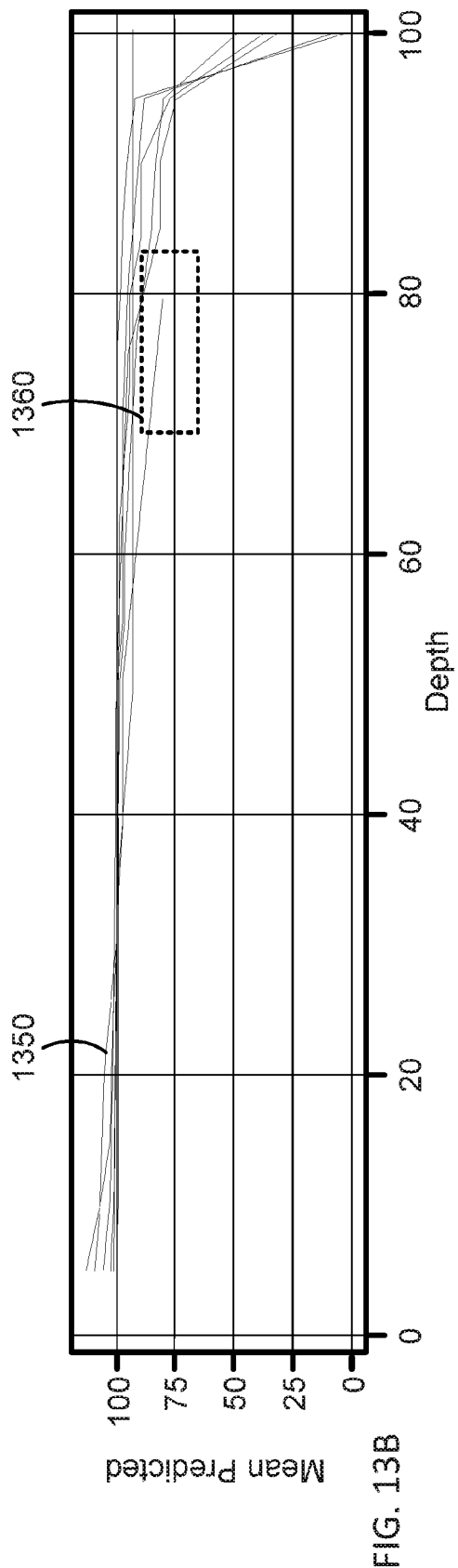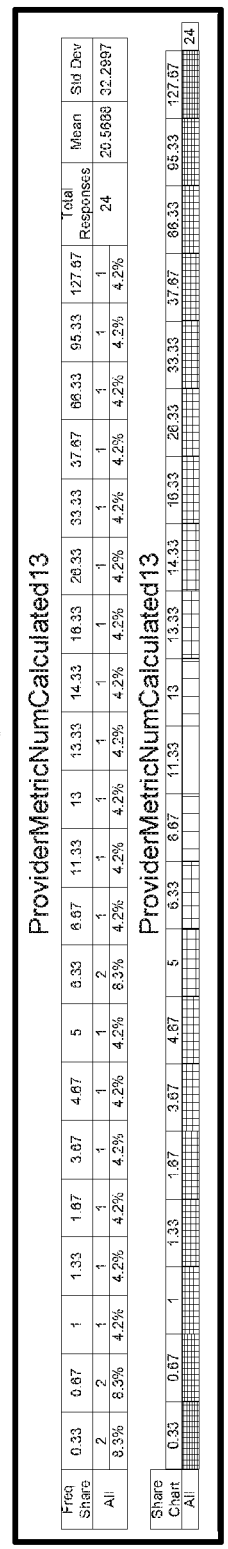
FIG. 13A
FIG. 13B
FIG. 13C

US 11,816,539 B1

SELECTION SYSTEM FOR MACHINE LEARNING MODULE FOR DETERMINING TARGET METRICS FOR EVALUATION OF HEALTH CARE PROCEDURES AND PROVIDERS

PRIORITY CLAIM

This application claims priority to U.S. Provisional Application No. 62/350,073, filed Jun. 14, 2016. That application and its contents are hereby incorporated by reference.

TECHNICAL FIELD

The disclosure relates generally to computer neural networks, and more specifically to a selection of a machine learning process such as a neural network analytical engine and computer-implemented method having built-in data cleansing, outlier-correction, pre-optimized variable selection, and/or self-adjusting targets and target weights to minimize statistical errors, minimize bias in the model, and/or provide validation against the null hypothesis.

BACKGROUND

Historically, websites and other software applications available to patients, and methodologies and guidelines available to hospitals and medical care payers have used primarily subjective data in rating and selecting physicians and medical facilities. Data sources for rating physicians often include anecdotal patient experience; commentary, such as blogs and patient surveys or online reviews; and factual, but not directly pertinent information, such as physician age, gender, stated medical philosophy, hobbies, etc. Even in existing evaluation methodologies that have attempted to measure quality of care through objective metrics, most physician "quality" metrics do not gauge quality; rather, they are process measures that capture compliance with practice guidelines. These attributes and analyses of abstract guideline compliance, while interesting and psychologically/subjectively functional, do not provide objective evidence regarding the physician's surgical abilities in general or with regard to a specific procedure. Further still, as identified in "The Strategy That Will Fix Healthcare," Michael E. Porter and Thomas H. Lee, Harvard Business Review, October 2013, "[r]apid advances in medical knowledge constantly improve the state of the art, which means that providers are measured on compliance with guidelines that are often outdated."

The intent of these existing technologies has been to attract potential patients to hospitals and to doctors based largely on standard marketing drivers, including promoting physicians-regardless of objective skill or facilities and regardless of adequate infrastructure or resources-that pay the recommendation technology provider for membership or advertising placement. According to Porter & Lee, this is grounded in a "central focus [that] has been on growing volumes and maintaining margins." These models result in the use of subjective data metrics as the main basis for rating, recommending, or selecting physicians.

Current subjective methods of rating of physicians do not provide an appropriate methodology for the selection of a physician to perform a specified medical procedure. Porter & Lee recognize the present model as a "health care system organized around what physicians do" rather than one "organized around what patients need." This fails to permit medical care choices that maximize quality of care and outcome, and cost efficiency. Evidence of this longstanding shortcoming is seen in the economic history of medical care in the United States. The share of GDP devoted to health care spending grew from 9% GDP in 1980 to 16% in 2008 and now is approaching 19% of GDP in 2014. The current methodologies and legacy delivery approaches and payment structures, which have remained largely unchanged for decades, fail to provide predictive certainty with regard to these goals. Further, these current methodologies may lead to the selection of physicians and facilities for the performance of medical procedures that result in inefficiency in medical spending, increases in overall medical spending, increased risk to patient health, and reduced quality of outcomes for patients. For example, the selection of a surgeon based solely on price comparison-that is, the cost to the patient or payer for completion of the needed procedure-may, in fact, lead to follow-on care and result in additional costs due to reduced quality of outcome. Similarly, the failure to identify a medical facility having resources statistically shown to increase accurate diagnosis, determination of operability, and the like, or failure to select a physician with objectively relevant skills, experience, or certifications is likely to reduce the likelihood of a positive patient outcome.

The subjective medical caregiver selection methods of the past have demonstrated a critical shortfall in their inability to objectively quantify and standardize medical outcome information regarding disparate and numerous medical procedures found in voluminous published medical research. Despite this recognition and the longstanding and numerous efforts of the medical industry, Porter & Lee conclude that "[a]round the world, every health care system is struggling with rising costs and uneven quality despite the hard work of well-intentioned, well-trained clinicians. Health care leaders and policy makers have tried countless incremental fixes-attacking fraud, reducing errors, enforcing practice guidelines, making patients better "consumers," implementing electronic medical records-but none have had much impact."

Efforts to study and analyze objective metrics for evaluation of medical caregivers for a particular procedure have been attempted. Such efforts have improved the analysis of such procedures to provide better quality and cost effectiveness guidance for patients. However, such systems still rely on known relationships between metrics relating to a facility and a particular caregiver and do not provide the ability to refine such relationships or to apply new data relationships.

The need therefore remains for a method of deriving objective data from medical facilities and caregivers and selecting a medical provider and facility for performance of a specified procedure based on objective, numeric representation learned from relationships of data. There is a further need for a learning system that can return objective target ratings for performance of a procedure based on health care provider data and facility data, thereby objectively improving medical outcomes. There is also a need for an unsupervised learning system that can analyze input metrics from facilities and health care providers and determine relationships between metrics to provide more accurate ratings for performance on a particular procedure based on the input metrics.

SUMMARY

One example is a medical analytical system for determining a rating for evaluation of a medical procedure. The system includes a user interface accepting a request for a rating of the medical procedure. A database includes a plurality of input data metrics each related to one of health care provider quality metrics or health care facility quality metrics. The quality metrics are derived from a literature database. A neural network processor includes a plurality of input nodes coupled to the database and the user interface, a plurality of hidden nodes, and at least one output node coupled to the hidden nodes. The input nodes each accept one data metric from the database and apply at least one weighting factor learned through a training set of input metric data and health care provider and health care facility output ratings to connections to succeeding hidden nodes in the neural network. Each output node provides a rating target value for the medical procedure based on the neural processing of the data metrics. A display interface is coupled to the plurality of output nodes to display a determined rating based on a comparison of the rating target value and one of the data metrics for the medical procedure.

Another example is a method of determining a rating of a medical procedure. The method includes populating a database with input data metrics related to one of health care provider quality metrics and health care facility quality metrics. A neural network including input nodes, hidden nodes, and output nodes is trained to determine the weighting of a plurality of input data metrics. A plurality of input data metrics from the database is input to a corresponding plurality of input nodes operated by one or more processors. The determined weighting factors are applied to connections from the input nodes to succeeding hidden nodes via the one or more processors. A target rating value of the medical procedure is applied from one of the output nodes via the one or more processors. A rating based on comparing a health care provider quality metric value or a health care facility quality metric value is determined with the output target rating value. The rating is displayed on an electronic display coupled to the output nodes.

Applying these processes to surgical metric targeting and metric targeting weighting in particular, though not necessarily, provides several unique technical advantages to the functioning of a computer system implementing a neural network, including:

a) data cleansing and outlier-correction processes are built into the neural network and therefore do not require the use of a human analyst, which ensures that only high quality data is entered into the neural network to minimize statistical errors in the model;

b) pre-optimized automated variable selection is provided to the neural network multilayer perceptron (MLP) model, which minimizes bias within the model by eliminating variables that are unrelated to driving the metric targets and target weights for each surgical procedure metric set; and c) generation of metric targets and metric target weights that are statistically significant and differentiated from random effects and self-adjusting to changes in the size and scope of the input data sets, and can be deemed valid against the null hypothesis test.

Additional aspects of the invention will be apparent to those of ordinary skill in the art in view of the detailed description of various embodiments, which is made with reference to the drawings, a brief description of which is provided below.

BRIEF DESCRIPTION OF FIGURES

Exemplary embodiments are illustrated in referenced figures. It is intended that the embodiments and figures disclosed herein are to be considered illustrative rather than restrictive.

FIGS. 11A-11B is a table showing the scoring for different selections of learning algorithms for calculation of an example case volume metric in the system shown in FIG. 9;

FIG. 12A is a table showing the results of the memory based reasoning of determining a case volume metric target;

FIG. 12B is a table showing the results of the memory based reasoning of determining a case volume metric target;

FIG. 13A is a graph showing the modeling results of the example nine machine learning algorithms for an example metric;

FIG. 13B is a graph showing the modeling results of the example nine machine learning algorithms where no statistical change detection exists for the lower-bound classifier; and FIG. 13C is a chart showing the result of factor analysis that may serve as the secondary statistical confirmation process conducted to provide a verification checkpoint for that classifier selection in the rare condition where no there is no statistical change as shown in FIG. 13B.

DETAILED DESCRIPTION

Figure 1:
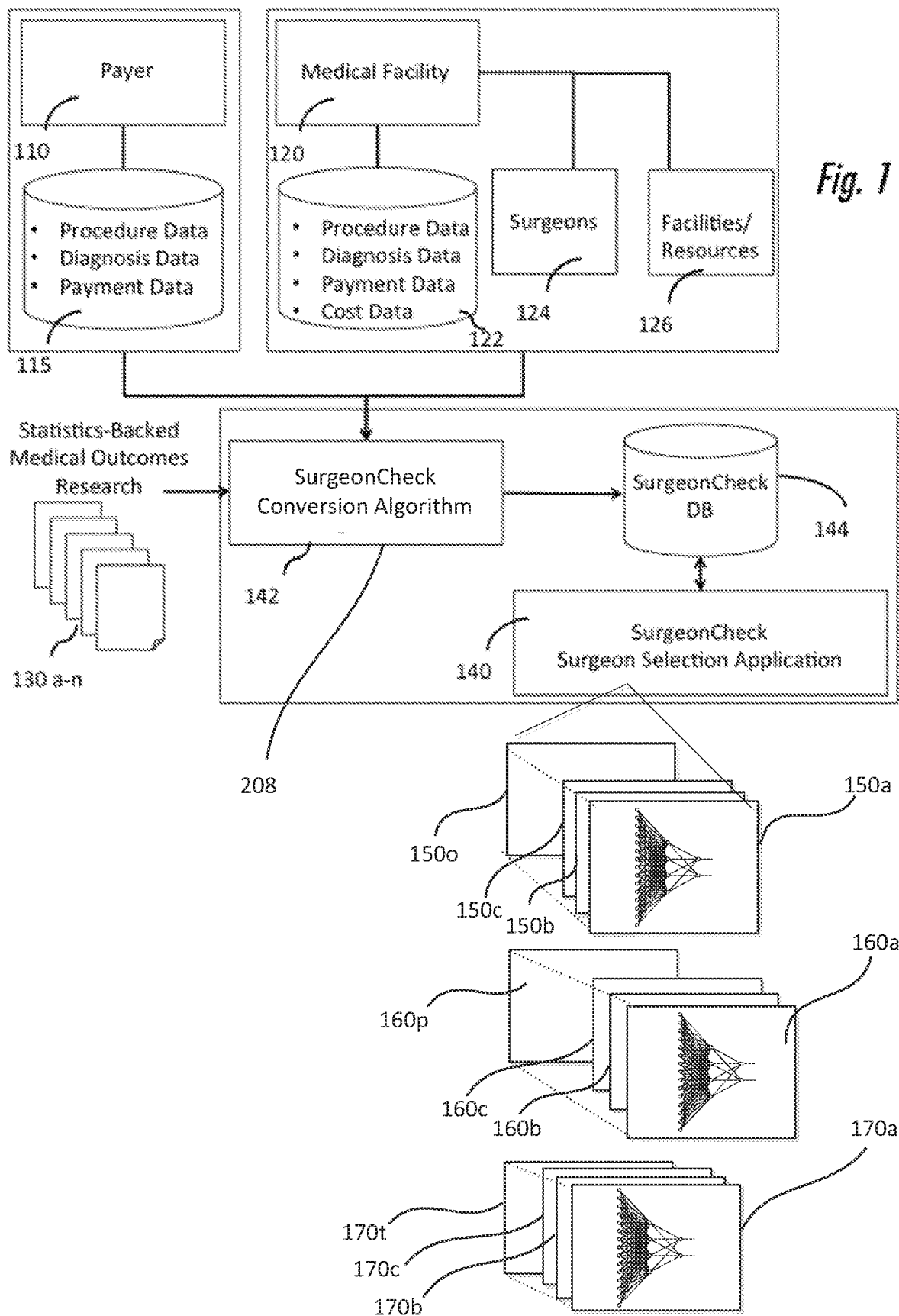
FIG. 1 is a block diagram illustrating the sources of data and the extraction, transformation, and loading flow of the data into a system for providing evaluation of health care services.

FIG. 1 is a block diagram of an example health care provider analysis system, showing the flow of information from multiple sources, in multiple formats into a physician selection system 140 providing access for users to objective representations of quality of care information, health care facility and resource information, and procedure cost information. The physician selection system 140 is also referred to in this disclosure as "SurgeonCheck" and those terms are interchangeable within the context of this disclosure. The physician selection system 140 is provided to users for the purpose of selecting an objectively highly qualified medical provider in response to the user's specification of a particular medical procedure, for example a specific surgical procedure.

Medical facilities 120, such as hospitals, maintain voluminous records relevant to a potential patient or other party's evaluation of performance of the facility's staff and physical and functional medical resources. The medical facility 120 typically maintains, for example, records detailing information about its staff, such as records regarding its surgeons 124. These records may include historical data listing the procedures performed by each physician, general information such as specialty, location, credentials, certifications, and the like. The medical facility 120 also maintains records regarding its infrastructure and resources 126, such as the facility's possession of specific medical devices, for example specialized medical imaging or advanced surgical tools. Additionally, some medical facilities 120 maintain records of historical patient treatment data 122, such as diagnoses, treatments, complications or procedures performed, payment data-whether received from the patient or a third-party payer-and in some cases cost data for the treatment provided.

Third-party payers for medical care 110, such as insurance companies and self-funded corporate health insurance plans, also maintain copious treatment and payment data 115, often including procedures performed, diagnoses, complications, and payment information. All of the above data may be provided to the SurgeonCheck surgical cost and surgical quality database 144 via data feeds and bulk data loads, as well as integration with other systems via application programming interfaces (APIs), populating the database through the use of several data sources, including but not limited to hospital facilities, providers (surgeons), insurers, and third-party agencies.

Each of these data are objectively useful in the selection of appropriate physicians and facilities for particular medical care when uniformly, numerically represented and combined with scientifically generated industry-wide data regarding medical outcomes and the resultant total costs of the particular medical care. Such industry-wide data, however, exists in copious and disparate medical research literature 130*a-n*. This medical research literature provides statistically derived probabilities of particular outcomes and procedure success as well as aggregated and analyzed cost and payment data for particular treatments. The voluminous data found in the literature 130*a-n*, however, is not standardized and may not even be presented in purely numeric format, often being contained in lengthy text-based articles analyzing the subject.

By analyzing and standardizing the data from the medical research literature 130*a-n* and from expert medical panels, the present system, through the SurgeonCheck extract-transform-load (ETL) algorithm 142, establishes objective metric data points relevant to the selection of a provider and facility, and prediction of cost for a specified medical procedure. The algorithm then stores the transformed information from the medical literature 130*a-n* as a finite data point or numeric range in the SurgeonCheck database 144 as a specific comparison point or metric to be considered in the selection process. The SurgeonCheck ETL algorithm 142 also stores data points and outputted discrete or continuous values in the SurgeonCheck database 144 relating to the same medical procedure. The SurgeonCheck ETL algorithm 142 also receives data input 122, 124, and 126 provided to the operator of the system by medical facilities 120 and data 115 provided by payers 110 and stores in the SurgeonCheck database 144 now standardized data representations of this information. During the ETL process in this example, clinical data provided by medical facilities 120 and data 115 provided by payers 110 is categorized by a grouping algorithm that groups clinical data into specific procedure groupings. Identifying clinical data by procedure groupings provides steering to the rating analysis engine as to which clinical data is relevant and should be included in the rating process. At this point, the SurgeonCheck application logic 140 has objectively quantified values through which it is capable, via a series of neural net analytical engines, of objectively accepting input physician, facility, and payment data to determine the range of standardized metric target values representing the medical research literature and the weight of each metric in order to aid a user in the selection of a surgeon and facility objectively likely to provide high quality care and efficiency in total cost of that care. In this example, each procedure available to a user has a number of neural net analytical engines that determine the range and weight for each relevant factor. In this example, the SurgeonCheck application logic 140 includes analytic engines 150*a*-150*o* that represent the fifteen relevant metrics for evaluation of a provider of a lung cancer resection procedure. Another set of twenty analytical engines 160*a*-160*t* is used for the evaluation of a provider of a roux en Y bypass procedure. Another set of sixteen analytical engines 170*a*-170*p* is used for the evaluation of a colonoscopy procedure. It is to be understood that there is a set of engines for each of the procedures. The number of engines in the set is determined by the number of the metrics most relevant to evaluation of a provider and a facility for the specific procedure.

A person of skill in the art will recognize that the SurgeonCheck database 144 may also store numerous other data, for example and without limitation, hospital address and contact information, physician demographic data such as age and gender, and any other objective or subjective data that may be deemed useful by the system operator.

The inclusion in the system of the copious data regarding facility infrastructure and resources, and availability of those data to the selection algorithms described herein, provide particular advantage over the prior art by calculating objective provider selection guidance based not solely on physician predictors in a vacuum, but rather in combination with the resources required for the skilled physician to obtain the highest likelihood of achieving successful outcome for a particular procedure.

Figure 2:
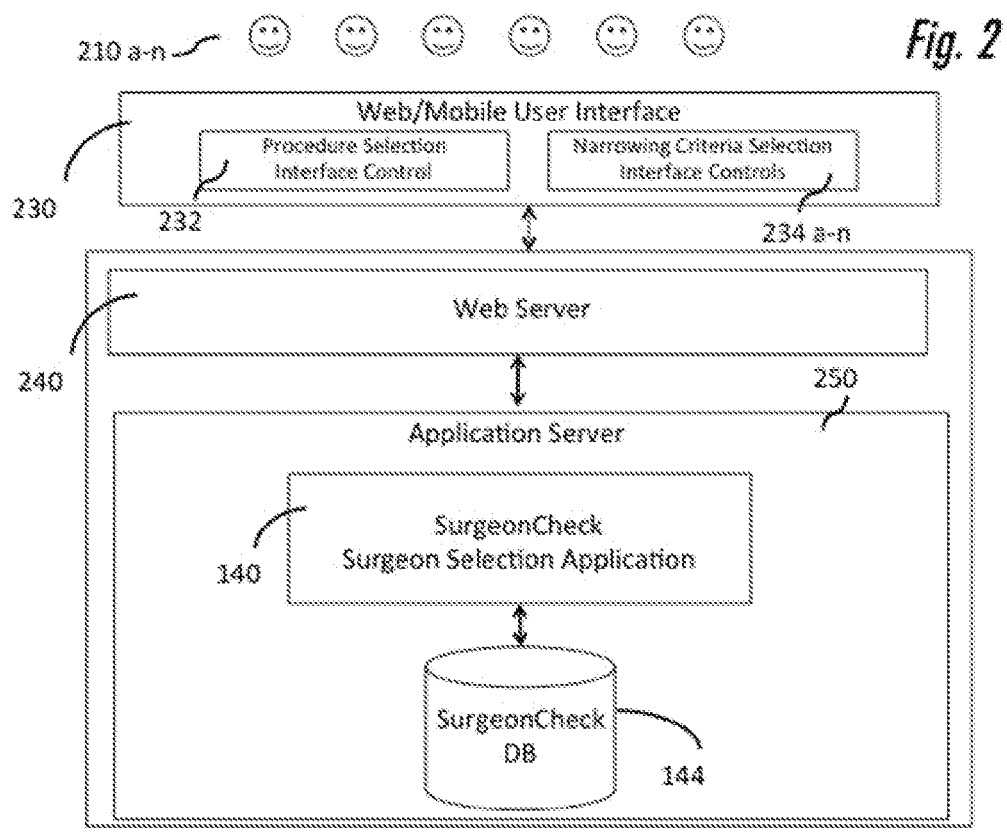
FIG. 2 shows the flow of user interaction in one Internet-enabled example of a system for providing evaluation of health care services.

As shown in FIG. 2, an example of the evaluation data from the system in FIG. 1, may be made available to users via the world wide web, for instance, through a web browser or mobile device. The user 210*a-n* connects to the system through a standard web server 240 connected to an application server 250 running the SurgeonCheck application 140 and also housing or communicatively connected to the SurgeonCheck database 144.

A user 210 can be defined as any person, provider, potential patient, insurance company, employer, Medicare, or other health care agency that registers for a log-in access, as later described. It is expected that the multiple users of the system may be located in a plurality of specific geographic locations. The SurgeonCheck system maintains rights of access and authorization for each user and may limit the portions of the system or data accessible to a specific user. For example, programming may be provided to ensure compliance with certain laws and regulations, such as the Health Insurance Portability and Accountability Act (HIPAA).

The user interface 230 prompts a user 210a-n to select or identify a specific medical procedure. In certain embodiments, the user may select the procedure from a pre-populated list 232, and in further embodiments the user interface may alternatively prompt the user to enter information relevant to the selection of a procedure and guide the user toward the selection of the specific procedure, such as by allowing the user to search for a procedure by name, symptom, keyword, or the like. After the user 210 provides information about the type of surgical procedure, the exemplary system may generate an explanation of the related surgery or surgeries and present to the user informational material and realistic scenarios of when each surgical procedure would be necessary. The user will indicate, such as by clicking or tapping a user interface element, or otherwise activating such functionality, such as through voice, gesture, or other known control methods, the selection of a specific procedure, at which time the system presents additional information beyond the simple explanation of the surgery and prompts for further user input to a process that will aid in the selection of a high performing surgeon and surgical facility for the procedure. The further information may be gathered through various user interface controls or input methods 234a-n, which are known in the industry. By way of example, the user can narrow the results geographically by inputting a postal code (zip-code) and desired proximity to patient location input. The collection from the user of narrowing criteria will aid in the selection of a single provider or short list of appropriate providers, such as by generating a list of surgeons and facilities within a specified geographic region. The system makes this selection by comparing the values for the relevant data points for individual facilities and providers with the literature-backed metrics with respect to the specified procedure and also applying any filters appropriate to the user-entered narrowing criteria.

The user may also provide individualized medical data for use in the provider rating system. In such example, the derived surgical cost and provider quality rating results are generated based on the input specific to each user 210 and correlation with the information provided from various data sources 110, 120, and 130. Each surgical cost and surgical quality rating result in such embodiment is user-specific. A first user 210a will therefore obtain a first surgical cost and surgical quality rating results, while each second and subsequent user 210b-n will receive a second and subsequent surgical cost and surgical quality rating results. The rating information generated in the surgical cost and surgical quality rating results may be cycled back into the SurgeonCheck database 144 as a further data source for refining the target metric values determined by the analytical engines such as the analytical engines 150a-150o in FIG. 1 for each specific procedure while remaining confidential to users. Similarly, the SurgeonCheck database may regularly receive updates to literature-based data and third-party provided data. In this way, the system keeps the SurgeonCheck surgical cost and surgical quality database 144 updated with rating information for the providers (surgeons) and facilities for all the procedures that the providers perform and current predictive data.

The SurgeonCheck database 144 includes database tables for specific surgical procedures in this example. For each surgical procedure, the database table provides storage for each of the discrete or continuous values shown by the medical research literature to be predictive of quality outcome and/or overall cost of treatment. These values objectively represent surgeon qualifications, patient symptom and recovery evaluation criteria, medical facility evaluation criteria including staff, programs and infrastructure, and cost metrics, each of these values having been calculated through the SurgeonCheck ETL 142 based on the medical research literature relevant to the individual procedure. As will be explained below, different metrics may be stored in the database table from unsupervised learning by the neural net analytical engines such as the neural net analytical engines 150a-150o of the Surgeon Check application 140. Each table's structure defined by the objective criteria relevant to that procedure based upon the medical research literature.

In addition, The SurgeonCheck database data model is logically arranged to represent layering of data retrieval processes, which are divided into layers based on the type of data sourced. Within each layer, a table is provided for each topic of information obtained. In this example, the SurgeonCheck database data model and architecture include a physician layer, a metrics layer, a procedure look-up layer, an audit layer, a patient layer, and a reporting layer.

The "Physician Layer" is where the demographic and qualification data for providers and facilities are entered and subsequently updated on a regular or ad hoc basis. A record is stored here for each procedure performed by a provider such as a physician/surgeon, thus providing the procedures to be rated for each specific provider and the facilities at which they perform the procedure.

The "Metrics Layer" includes a table for each procedure for which the SurgeonCheck exemplary web-based program provides ratings/scores. In each of these procedure tables there is a record of every provider that is known to perform that procedure as well as every facility at which the provider performs the procedure. Within the Metrics Layer, every surgical procedure metric as well as the rating results of each procedure/provider/facility combination is stored within the SurgeonCheck database 144.

The "Procedure Look-Up Layer" contains data used by the user interface to provide the user 210 the necessary data to search for their procedure. The "Audit Layer" stores data about each user transaction within the SurgeonCheck web-based program. The "Patient Layer" captures the demographic and payment information regarding the user 210. The "Reporting Layer" contains the provider and facility rating data that is populated by the SurgeonCheck application 140.

In this example, the SurgeonCheck database 144 is populated by operation of the SurgeonCheck ETL 142. In this example, the ETL algorithm 142 is multiphasic, but it will be understood that such is not a requirement for all embodiments of the present invention.

Procedure-centric metric sets correspond to medical procedure major groups, such as general surgery, cancer, or bariatric surgery. Each of the medical procedure major groups in the exemplary system corresponds to one or more ICD-9 procedure codes and one or more CPT procedure codes. It is possible, however, to expand the corpus of medical procedure major groups to include descriptors outside of the ICD-9 specification or any other standard class of disease identification scheme.

Each of the medical procedure major groups includes medical procedures falling under the particular group. Each of the medical procedures includes a set of metric targets that is a quantifiable, research-backed metric. For example, one or more metric set targets may be identified and stored relating to the roux en Y bypass procedure under the medical procedure major group of bariatric surgery. Similarly, inguinal hernia repair may be identified as a procedure under the medical procedure major group general surgery. Each metric set target may be identified by manual identification or by natural language extraction by, for example, a supervised or unsupervised learning algorithm, from the statistics-backed medical outcomes research 130a-n. In an exemplary embodiment, the metric set targets are mapped to zero or more ICD-9 diagnosis codes. One of skill in the art will recognize that some examples may allow for further medical procedure specificity by the addition of target set records or subsidiary target set descriptors, such as defining separate metric set targets for bilateral versus unilateral laparoscopic inguinal hernia procedures, which may, but need not correspond to ICD diagnosis codes or any other standardized procedure or diagnosis classification scheme.

With the metric set target records identified, the conversion algorithm 142 extracts a plurality of threshold values or threshold value ranges from the statistics-backed medical outcomes research 130a-n. These values or ranges are those measurable quantities that have been determined to correspond to successful medical outcomes, for example, those indicating lowered likelihood of readmission or complication or reduced hospitalization time. Each identified threshold value or threshold value range, in the exemplary system, corresponds to a single database row in the table representing the metric sets. The analytical engines of the Surgeon Check application 140 determine the target ranges and importance of each of the relevant input metrics. The application 140 then returns an overall composite score based on the input metric values and the calculated weights for each metric.

Figure 3:
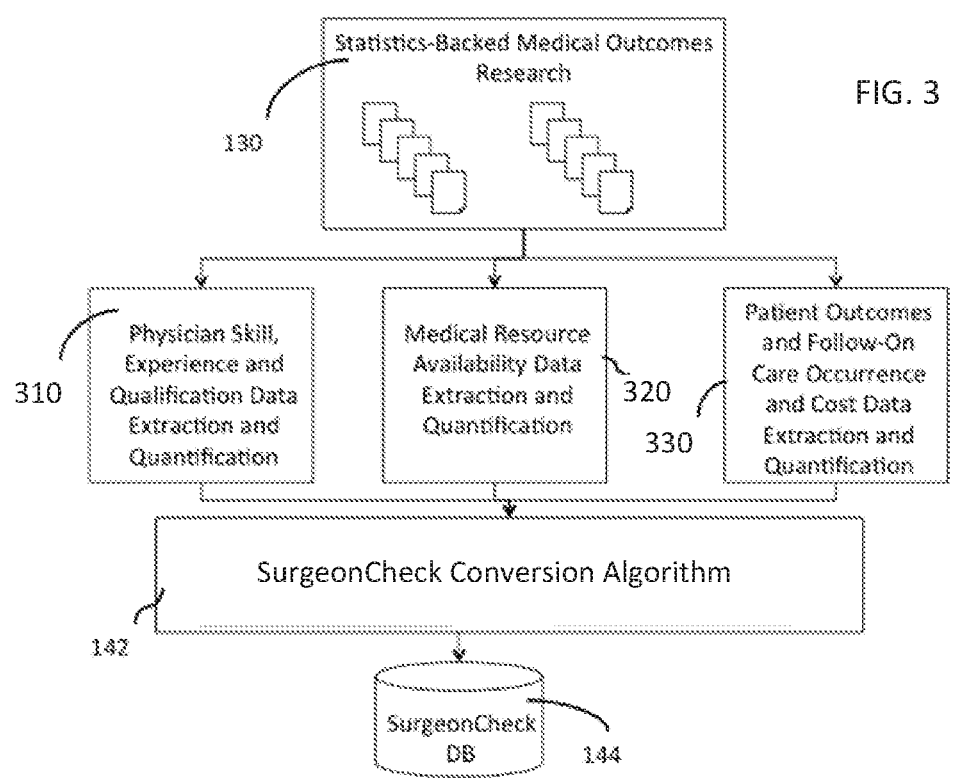
FIG. 3 is a block diagram showing the extraction of literature-based research information and transformation of the extracted information to finite or discrete quantities, loaded to the component database of the system in FIG. 1.

FIG. 3 further illustrates one example of the segmentation of incoming procedure, facility and provider data, and reassembly into the structure of the SurgeonCheck database. As shown, the information presented in the statistics-backed medical research 130 is parsed to determine, with regard to a single medical procedure, the factors relevant to the objective evaluation of the physician performing the procedure 310, the factors relevant to the objective evaluation of the facility in which the procedure will be performed and its resources 320, and the factors relevant to the objective evaluation of the patient's outcomes and overall procedure cost 330. Having identified these factors, the SurgeonCheck ETL algorithm 142 reduces these factors to distinct values for storage in the SurgeonCheck database 144. This process of conversion 142a to finite data values for each metric in this example takes the form of a number within a specified range, a number representing a Boolean value (e.g. 1=yes, 0=no) or code or flag or the like. These possible values are derived from study of the medical research literature 130 and can be accomplished by electronic means, by human intervention, such as through a medical advisory board, or both. Having completed the conversion of each category of medical research information to data values within a discrete or continuous range (which may be infinite) and stored them in the SurgeonCheck database 144, the system can use these data to compare data describing individual providers, facilities, and/or actual patient outcomes to the weighted, procedure-specific factors in order to accomplish the purpose of the system-rating physicians and facilities based upon the likelihood of successful outcomes and acceptable cost for future procedures.

As explained above, the physician selection system 140 includes a series of analytical neural net engines such as the engines 150a-150o, 160a-160t, and 170a-170p that are each learning classification systems operated by a processor or processors. Alternatively, each of the neural net engines can be individual programmable hardware such as floating programmable gate arrays (FPGA). Each of the sets of analytical neural net engines is associated with a particular medical procedure that may be evaluated for a particular provider and facility. Each of the set of analytical neural net engines 150a-150o, 160a-160t, and 170a-170p in FIG. 1 is coupled to the database 144. As will be explained below, a particular set of analytical neural net engines associated with a particular procedure produce a rating target value for evaluation metrics of a physician and facility performing the specific procedure based on relevant data input metrics. The application 140 therefore produces a target value for each metric within the surgical procedure metric set, along with a weighting value for each metric. The resulting evaluation scores and ratings are combined into a composite rating that is communicated to the user interface 230 in FIG. 2 for display of the outputs. This may be broken down into both an overall quality rating and an overall cost rating.

Figure 4:
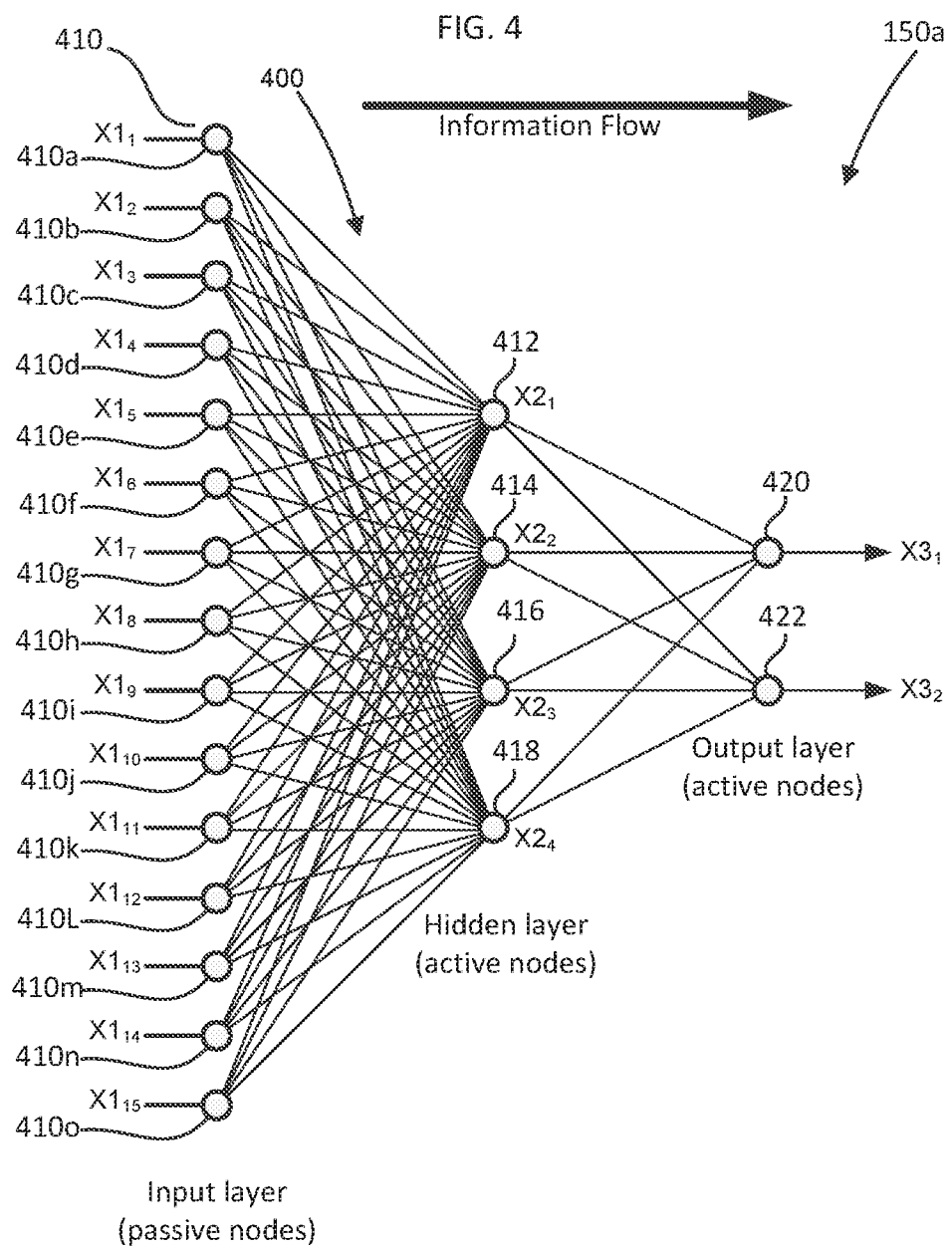
FIG. 4 is a block diagram of a neural net implementation of an analytic engine for evaluating the rating range of a facility and provider for performing a procedure in FIG. 1.

FIG. 4 is a block diagram of an example analytical neural net engine such as the analytical neural net engine 150a in FIG. 1. The analytical neural net engine 150a in FIG. 4 represents a series of neuron nodes in a neural network 400 mimicking a learning process in a biological brain, with each node representing a competing state potential within a larger model space. The analytical neural net engine 150a includes a feed-forward neural network 400 that includes a series of input nodes 410, a series of hidden nodes 412, 414, 416, and 418, and two output nodes 420 and 422. In this form, a neural network without feedback-loop cycles is called a perceptron, or a feed-forward neural network. Such a neural network may also have more hidden layers that are not connected directly to the input node sets (hence, a hidden layer inside the network model). Thus, the network 400 is an example of a supervised multi-layer feed-forward neural network. It is used for the purpose of learning how to calculate a target value and target weighting of a metric within a metric set associated with a surgical procedure.

Each input node 410 in FIG. 4 has a number (e.g., $X1_1$ to $X1_{15}$) and a set of links corresponding to the further hidden nodes 412, 414, 416, and 418 with another pair of identification numbers (e.g., $X2_1$ to $X2_4$). The hidden nodes 412, 414, 416, and 418 each represent functions that will variously compute a linear transformation of the previous layer of input nodes (or other hidden nodes), followed by calculating any non-linear relationships, which can include the use of stochastic transformations in this hidden layer or further hidden layer. The output node 420 is the target value of a metric that constitutes a dependent variable such as the desired average number of cases per year for a provider that are sufficient to meet a performance criteria. The output node 422 is another example of a dependent variable and outputs the multiplier (weight) for the average number of cases signifying the importance of that value for quality. The exact number of nodes and node layers will be dependent upon the final optimized design for the particular classification problem. It is to be understood, that the engine 150a in FIG. 4 is shown for explanation purposes, and an actual engine for evaluating a procedure will be more complex than shown in FIG. 4. The activation plotting function determined by the results of calculations applied to the data based on correlations between the independent variables and the dependent target variable. This provides insight into variable importance by examining the calculated weights between the layers. For example, input (explanatory) variables that have strong positive associations with the response (target) variable are expected to have many connections between the layers. This characteristic is advantageous in that it makes the neural network very flexible for modeling non-linear functions with multiple interactions.

In this example, the analytical neural net engine 150*a* relates to evaluating one metric for a facility or physician for performing a lung cancer resection procedure. In this example, the number of input nodes 410 is selected in accordance with the number of relevant input metrics for the lung cancer resection procedure as explained above. A general goal of statistical modeling is to identify the relative importance of explanatory variables such as relevant input metrics for their relation to one or more response variables such as the classifications. In the specific neural net engine 150*a*, the outputs include the target value for one of the input metrics as well as the weight that is accorded that target value.

Thus, the input nodes 410 include input nodes 410*a*-410*i* that relate to metrics associated with the particular physician including provider quality metrics representing the educational and certification suitability of a physician for performing the lung cancer resection procedure and clinical metrics representing the clinical history of the physician with respect to the procedure. The input nodes 410 also include input nodes 410*j*-410*o* that relate to facility quality metrics representing the technological and staffing suitability of the facility with respect to the lung cancer resection procedure.

In this example, the input node 410*a* represents the average number of cases per year per the selected provider. This metric is normalized to a value between 1 and 0. The input node 410*b* represents whether the provider is a critical care intensivist 24/7 and is a binary value of 1 or 0. The input node 410*c* represents a quality percentile literature based scoring of the provider quality. This metric is between 1 and 5 and is normalized to a value between 1 and 0. The input node 410*d* represents the provider's open surgery procedure percentage and is normalized to a value between 1 and 0. The input node 410*e* represents whether the provider has participated in a multidisciplinary tumor conference and is a binary value of 1 or 0. The input node 410*f* represents whether the provider is a member of the Fellowship of Trained Interventional Radiology physicians and is a binary value of 1 or 0. The input node 410*g* represents whether the provider is a cytopathologist and is a binary value of 1 or 0. The input node 410*h* represents the surgical site infection rate where severity of illness = 1, a percentage score for the provider. The infection rate percentage score is normalized between 1 and 0. The input node 410*i* represents the 30-day mortality rate of the provider where severity of illness = 1. The mortality rate is normalized between 1 and 0.

The input node 410*j* represents whether the facility has a protocol for pathology reports and is a binary value of 1 or 0. The input node 410*k* represents whether the facility has an integrated PET/CT scan system and is a binary value of 1 or 0. The input node 410*l* represents whether the provider participates in the STS general thoracic databases and is a binary value of 1 or 0. The input node 410*m* represents whether the facility has stereotactic radiotherapy facility and is a binary value of 1 or 0. The input node 410*n* represents whether the facility has an endobronchial ultrasound system and is a binary value of 1 or 0. The input node 410*o* represents whether the facility has a cervical mediastinoscopy system and is a binary value of 1 or 0.

Additional input metrics for additional input nodes may be used such as additional facility quality metrics and provider quality metrics. Further, facility quality cost metrics representing facility costs for the procedure as well as cost metrics associated with the provider may also be used for other input nodes. Other input nodes may be directed toward patient specific data that may affect the evaluation of the facility and physician in relation to performing the lung cancer resection procedure. In addition, the target values may be adjusted to reflect individual metrics of the providers and facilities and for other factors.

In this example, there are fifteen data metrics that are deemed relevant to evaluation of a physician/facility performing the lung cancer resection. It is to be understood that there may be any number of different input metrics for this procedure and other procedures. The types of input metrics may be identical or different for different procedures. For example, the input of whether the facility has a stereotactic radiotherapy system for input node 410*m* may not be relevant and therefore excluded as an input node for an inguinal hernia procedure and would therefore not be an input node for the analytical engines 160*a*-160*t* used for evaluating that procedure in FIG. 1.

In contrast to traditional programming logic following a specific static set of pre-defined rules and weighting in relation to the input metrics such as an algorithm executed by a processor, the analytical neural net engine 150*a* in FIG. 4 is programmed by a learning process through mathematical pattern recognition. The engine 150*a* therefore solves the classification problem of classifying the particular physician provider and facility according to performance metrics. In this example, the two output nodes 420 and 422 represent two different types of ratings classifications for the facility and physician provider performing the lung cancer resection procedure. In this example, the input metric values from the database 144 may produce a target value of 110 for the average number of cases and a weight of 0.7. As explained above, the metrics for the specific provider and facility are compared with the calculated target metric values for an overall evaluation. Of course other ranges of classifications for different evaluation metrics may be output by adding output nodes. For example, a procedure may include classification in one of four ranges of evaluation scores. A more complex combined evaluation target value may also be output based on a combination of several metrics.

Using the data representing one or more of the logical database architecture layers from the database 144, the selection of an objectively best physician and facility for an identified procedure such as the lung cancer resection procedure may be made by determining the scores of each available physician and facility from the associated input metrics. The scores are compared with the target metric value determined by the set of analytic engines 150*a*-150*o*. For example, the average number of case scores of 80, 100, and 140 may be obtained for three different provider facility combinations for the lung cancer resection procedure. These values are compared with the calculated output target value of 110 for average number of cases with a corresponding weight value of 0.7 to evaluate the three different providers.

As explained above, the input nodes 410*a*-410*o* each include output links that are coupled to each of the hidden nodes 412, 414, 416, and 418. Each of the output links includes a learned weighting for the metric data input to the respective input node. The hidden nodes 412, 414, 416, and 418 sum the respective weighted metric data to determine intermediate values on output links to the output nodes 420 and 422. The output nodes 420 and 422 are coupled to the output links of the hidden nodes 412, 414, 416, and 418. The output links of the hidden nodes 412, 414, 416, and 418 also apply learned weighting to the values. The weighting factor for a given metric may be adjusted based on the calculated strength of the metric relationship to the other metrics within a surgical procedure metric set. If for example a patient readmission target was deemed to be a less statistically significant metric to overall surgical quality, that metric weighting would be reduced by the model. The example analytical engine 150a in FIG. 4 only has one layer of hidden nodes, but additional layers of hidden nodes may be linked between the input nodes 410 and the output nodes 420 and 422. Based on the summed values from the hidden nodes 412, 414, 416, and 418, the output nodes 420 and 422 decide whether the particular physician provider and facility falls within the classification assigned to the output node 420 or 422. The output nodes 420 and 422 of the analytic engine 150a thus calculate an objective, numerical physician provider rating range and the weight of the score by calculation based upon the identified relevant metric set target values and the learned weighting thereof.

In this example, the analytical engine 150a produces a target average number of cases a physician operating at a specific facility should perform as a provider of the lung cancer resection procedure at the identified facility. The input data retrieved for the input nodes 410a-g represent the resources of a medical facility where the procedure may be performed and metric set targets for medical facility resources relating to the procedure to be performed. The input data retrieved for the input nodes 410h-410o represent physician metrics data representing the skills, training, experience, and clinical history of a physician who may perform the procedure. Other data representing other identified qualities of a physician who may perform the procedure indicative of successful outcomes for the specified procedure may also be input to the input nodes. The output nodes 420 and 422 provide a rating metric value and relevant weight for the physician/facility combination for a particular metric such as the average number of cases per year per the selected provider. Each of the other engines 150b-150o in FIG. 1 determines a similar range and weight for another of the input metrics. The application 140 then provides a composite rating based on these outputs. The output may be displayed as a visual rating indicator, such as checkmarks, indicative of the final percentile score for the physician/facility combination, where more checkmarks indicate a higher percentile score and fewer (or no) checkmarks indicate a lower percentile score. An example of a final score for a physician within a specific procedure metric set and facility would be a quality checkmark score of 4 (out of 5) and a cost checkmark score of 3 (out of 5). These checkmark scores are based on a composite rating of a combination of evaluation against each metric target value, and the relative weight calculation or determined importance of each of those metrics.

The analytic engines 150a-150f in FIG. 1 learn the proper evaluation of the various input metrics for producing a rating for the respective evaluation metric target range. Learning is a process by which the free parameters (i.e., weighting assigned to links) of a neural network are adapted through a continuing process of stimulation. The type of learning is determined by the manner in which the parameter changes take place. In a general sense, the learning process may be classified as either supervised or unsupervised.

Supervised learning that does not rely on human intervention for the classification of distinct surgical procedure metric targets and target weighting used in scoring surgical providers may be performed by the example analytic engines in FIG. 1. The supervised learning is a methodology having separate phases within the overall routine. Generally, these include of an imputation phase, a Bayesian network with a Markov umbrella component, a neural network for high-performance classification, and lastly a CHAID (CHi-square Automatic Interaction Detection) decision-tree phase. The overall process flow within the system is continuous and self-filtering for purposes of generating the final metric target results and associated target weighting values within each metric set.

The supervised learning procedure begins with the imputation phase. The imputation phase addresses potential issues related to sensitivity problems of neural networks to missing values within portions of a data set, and also by addressing potential issues caused by statistically significant outlier values. This poor quality data could otherwise reduce the effective size of the available training data set, which might otherwise weaken the predictive and classification strength of the overall model. Imputation utilizes a series of replacement functions where missing or outlier interval variables are replaced by the median of non-missing and non-outlier values within the data set.

The second phase is the use of a Bayesian network with a Markov umbrella component, a process which determines a Bayesian (a probabilistic statistical) network model which determines a variable network structure from an input data set. In a Bayesian network model, each node will represent random variables and the links between nodes represent conditional dependency of the random variables. The Bayesian network is applicable for supervised learning predictive models as it provides a conditional independence structure and a conditional probability table at each node. The Bayesian network is augmented with the use of a Markov blanket function, which insures statistical independence of a given variable from non-related variables within the model, as a form of optimized variable selection. This is ultimately useful for determining if obtaining knowledge of variable "A" would change a belief about variable "B."

Figure 5:
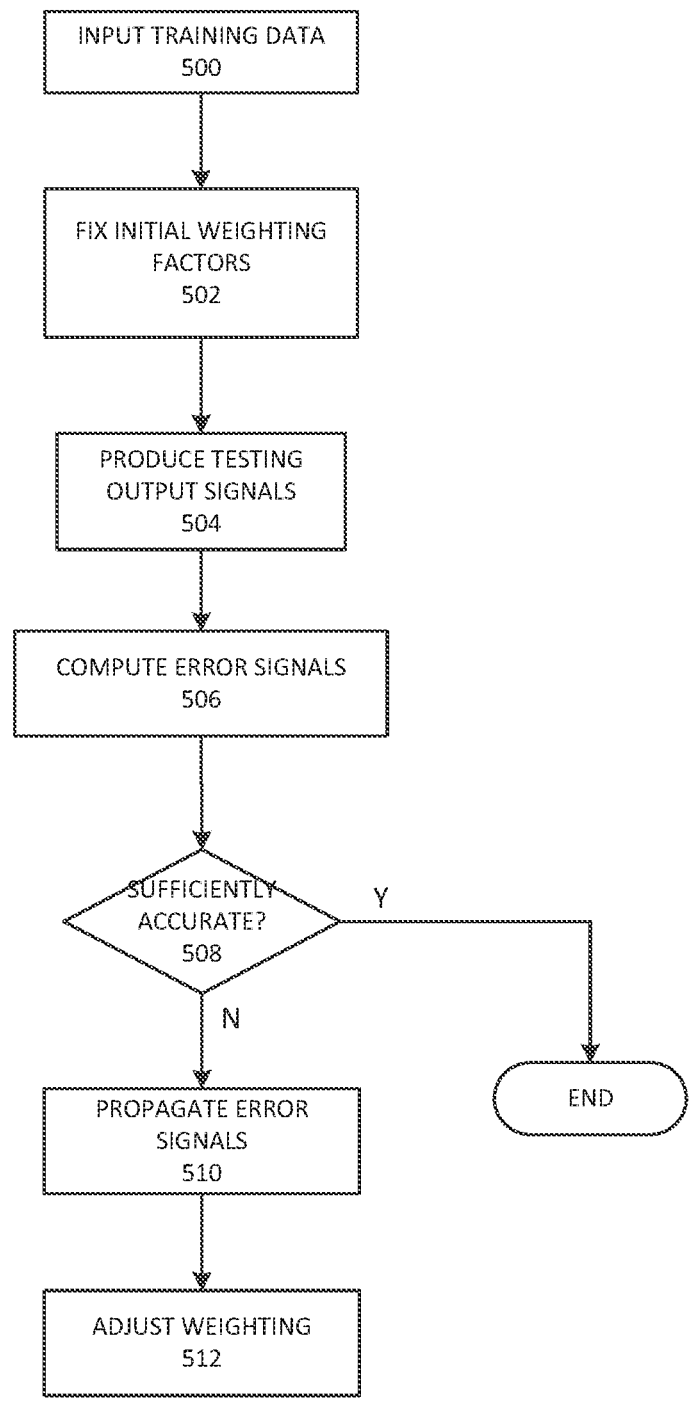
FIG. 5 is a flow diagram for a supervised learning process of the analytic engine in FIG. 4 to teach weighting of input metrics for determining the rating range.

FIG. 5 shows a flow diagram for a supervised learning process to teach the weighting factors of the interconnections of the analytical engine 150a in FIG. 4 after the imputation phase and network modeling is performed. The weighting factors of the links to the hidden nodes 412, 414, 416, and 418 and the output nodes 420 and 422 are thus determined so the actual outputs are statistically close enough to the actual outputs of the training data.

The process inputs a set of training data made up of a number of input and output examples that are a result of the imputation phase (500). In this example, the training set data include associated input metric data from the database 144 in FIG. 1 that is associated with known evaluation output metrics such as classification target scores corresponding with facility and physician metric data. The types of input metrics for the training set are based on use of statistical analysis of different potential input and output data to determine the relationship between the inputs and the outputs. In this example, the training set data includes inputs from the Physician layer of the database 144 and corresponding outputs from the Metrics layer of the database 144. The number of examples in the set training data set depends on the number of weights and the desired accuracy (minimization of error). The training data is detail level observation data for a provider/facility combination within a given metric set such as the average number of cases, across a range of input (explanatory) variables that have been pre-selected due to a detected linear or non-linear correlation after a statistical analysis has been conducted by the data scientist. In this example, there are the fifteen input variables, but a larger or smaller number of input variables may be pre-selected based on known relationships between the input variables and the desired output target range value.

The process goes through a forward phase where weighting of links in the network 400 in FIG. 4 are fixed (502). The nodes of the network 400 are established in response to the modeling phase. The initial weighting factors are determined by the activation plotting function of each input node within the neural network 400. The neural network process is then implemented by propagating the input data from the training set through the network of nodes layer by layer to produce outputs (504). In this example, the output data are the results of the neural network predictive model for a metric target value for the average number of cases per year per provider. The neural network process utilizes the optimized variable selection set from the Bayesian network model as the training set input. In this example, the network is a multilayer perceptron (MLP) neural network model with no direct connections between nodes and the use of a single hidden layer. The neural network MLP model adjusts internally derived calculated weights between each of the established node connections by minimizing an error function against actual values during the training process. The output of the neural network MLP process phase is a predicted set of target values and associated weight ranges for each of the appropriate metrics within a surgical procedure metric set.

The forward phase finishes with the computation of an error value between the actual resulting outputs and the desired resulting outputs from the training set (506). The computation of the error value is the root mean square of the error calculated in the model prediction compared with the actual values.

These target values and weight values are then sent to the final (fourth) phase of the machine learning system, which is a CHAID (CHi-square Automatic Interaction Detection) decision tree. The CHAID decision tree uses a methodology based on a test of similarity to determine whether individual values from an input set should be combined based on a response value. After combining similar input values, tests of significance are used to select whether these inputs are significant descriptors of desired target values, and if so, what their strengths (weights) are relative to other input variables.

The analytic engine is then checked to determine whether the calculated outputs are sufficiently close to the actual outputs of the training set (508). If the analytic engine is sufficiently accurate as determined by a data scientist, the process ends. If the analytic engine is not sufficiently accurate, the process implements a backward phase where the error value is propagated through the network of nodes 400 in FIG. 4 (510). Adjustments are made to the weighting factors to minimize the error between the actual output and the desired output in a statistical sense (512). The adjustments and the particular metrics for adjustment are made by a data scientist. The process then loops to the forward phase for further test data for refining the learning process (502). In this example, the backward phase is implemented by a sequential mode where adjustments are made to the weighting of the links of the network 400 on an example by example basis from the training set. The weighting for the links of the network 400 may also be adjusted by additional data in the database 144 to further refine the weighting values. Thus, the process shown in FIG. 5 may be run periodically with new input and corresponding output data from the database 144 as additional data is received from physicians and facilities to further teach the analytic engine 150a. In this example, with fifteen input metrics, generally learning occurs within 3-4 iterations, but additional iterations may be run to achieve greater accuracy.

This supervised learning approach allows for a decision tree that expands as data about a particular surgical procedure increases. It provides for a robust statistical test to ensure that only relationships that are significantly different from random effects are utilized as final target and weight value output. Statistical adjustments that address the potential for bias selection of variables as candidates for the final output is also conducted. The decision tree growth is terminated when the branch that is being produced fails a test of statistical significance. This test of significance is centered on the null hypothesis. The final output from the CHAID decision tree phase is written to the database as a target range value with an associated weight value for each metric within the metric set, for use in scoring the provider of that surgical procedure.

Figure 6:
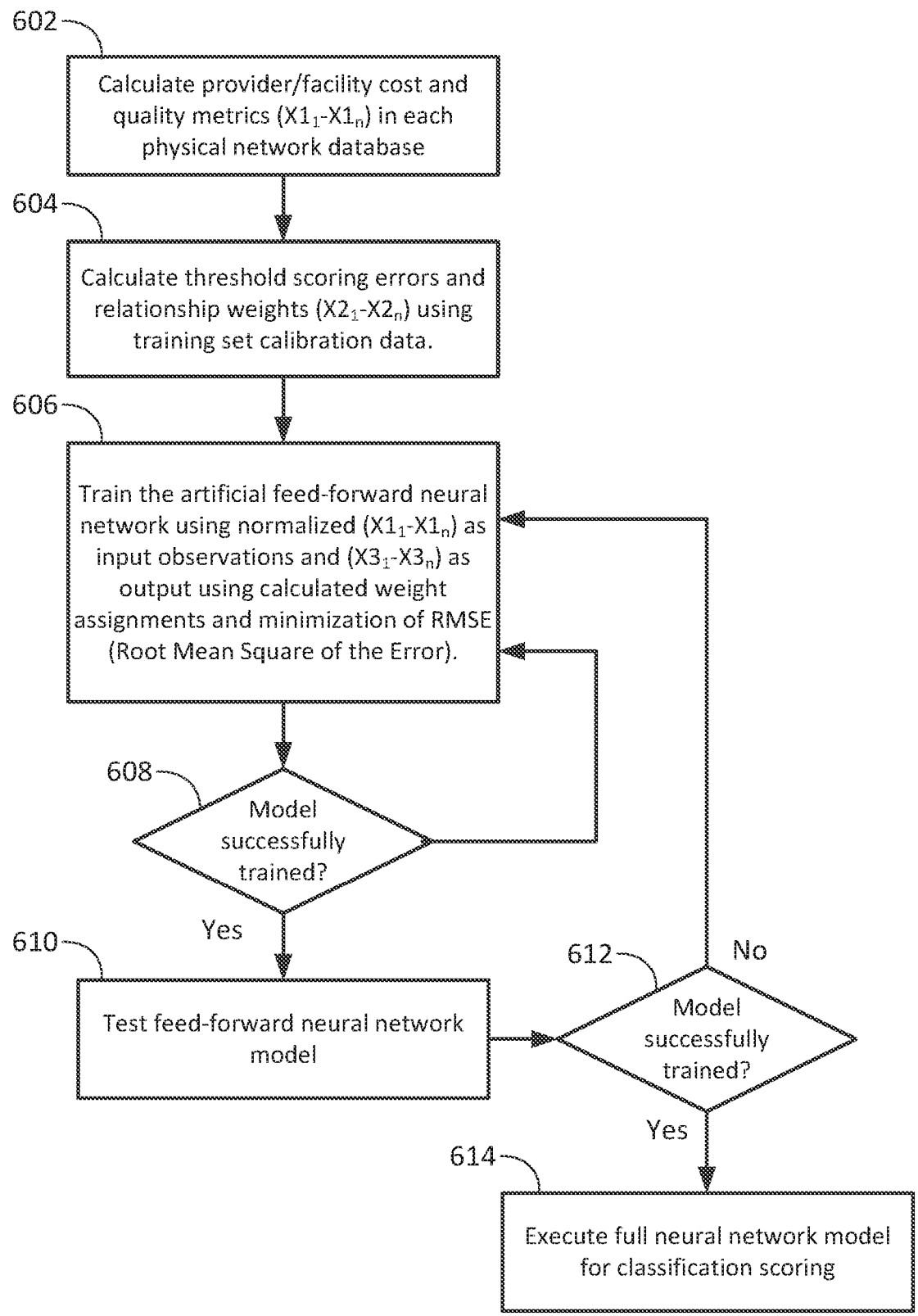
FIG. 6 is a flow diagram for an unsupervised learning process of the analytic engine in FIG. 4 to learn unknown relationships between input data metrics and evaluation outputs.

Another process to provide more accurate evaluations is an unsupervised learning process of the analytical engine 150a in FIG. 4. This process allows the discovery of previously unknown relationships between input metrics and output classification. Such a system would be custom-designed to work with data and metrics calculations stored in the database 144 in FIG. 1. One of the primary features of the analytical engines would be to undergo a process involving unsupervised learning to cluster input metric data into various categories based on statistical eigenvector calculations as shown in FIG. 6. The nodes may be organized in layers as shown in FIG. 4 to customize and enhance the model performance and learning capabilities, allowing for pattern discovery deeply embedded within the existing dataset from the database 144 in FIG. 1. A display interface may allow a user to enter different input metrics and use the analytic engines to determine unknown relationships to allow more accurate ratings based on the different input metrics.

FIG. 6 shows the process of unsupervised learning based on an analytical engine such as the example analytical engine 150a in FIG. 4. The system initially calculates input metrics including provider cost and provider quality metrics data and facility cost and quality metrics data from the database 144 in FIG. 1 (602). Each separate metric constitutes an input node for the analytical engine. In this example, there are 186 discrete metrics relating to either the provider or facility. Thus, the example analytical engine may have 186 input nodes. Of course, other types of metrics may be added. Alternatively, a smaller subset of metrics may be used for the unsupervised learning.

The system then calculates threshold scoring errors and relationship weights for each of the hidden nodes using training set calibration data (604). An example of this relationship weighting calculation could be the case volume metric being calculated to have a weight value of 0.8. The network is then trained by using normalized metric data as input observations and the output nodes as an output using calculated weight assignments on the input metrics and minimization of root mean square of the error (606). The root mean square of the error (RMSE) is a measure of accuracy within the neural network model to real world data used to train and validate the model. By achieving a lower relative RMSE score the model may be increasingly accurate. The system then determines whether the model is successfully trained (608). If the model has not been successfully trained such as failures due to too large an error, the process loops back for further training (606). If the network is successfully trained, the model produced is tested (610). The system then determines whether the model has been successfully tested (612). If the model is not successfully tested, the process loops back for further training. If the model is successfully tested, the model of input metrics and their respective weighting may be deployed as one of the analytical engines of the SurgeonCheck application 140 in FIG. 1 (614).

A neural network thus learns the relationships between different input and output dimensions within the dataset fed to it from a larger database, making this approach a solution for solving classification scoring problems for which a simple linear solution may not already or consistently exist. Non-linear relationships that are often inherent in complex datasets are one example of those potentially solvable via this machine learning solution. This approach classifies input data into uniquely determined output categories for provider/facility surgical procedure scoring. The unsupervised learning thus provides new groupings of input metric data and corresponding weighting of the links to the hidden and output nodes for more accurate scoring of a physician and facility of a particular procedure.

Figure 7:
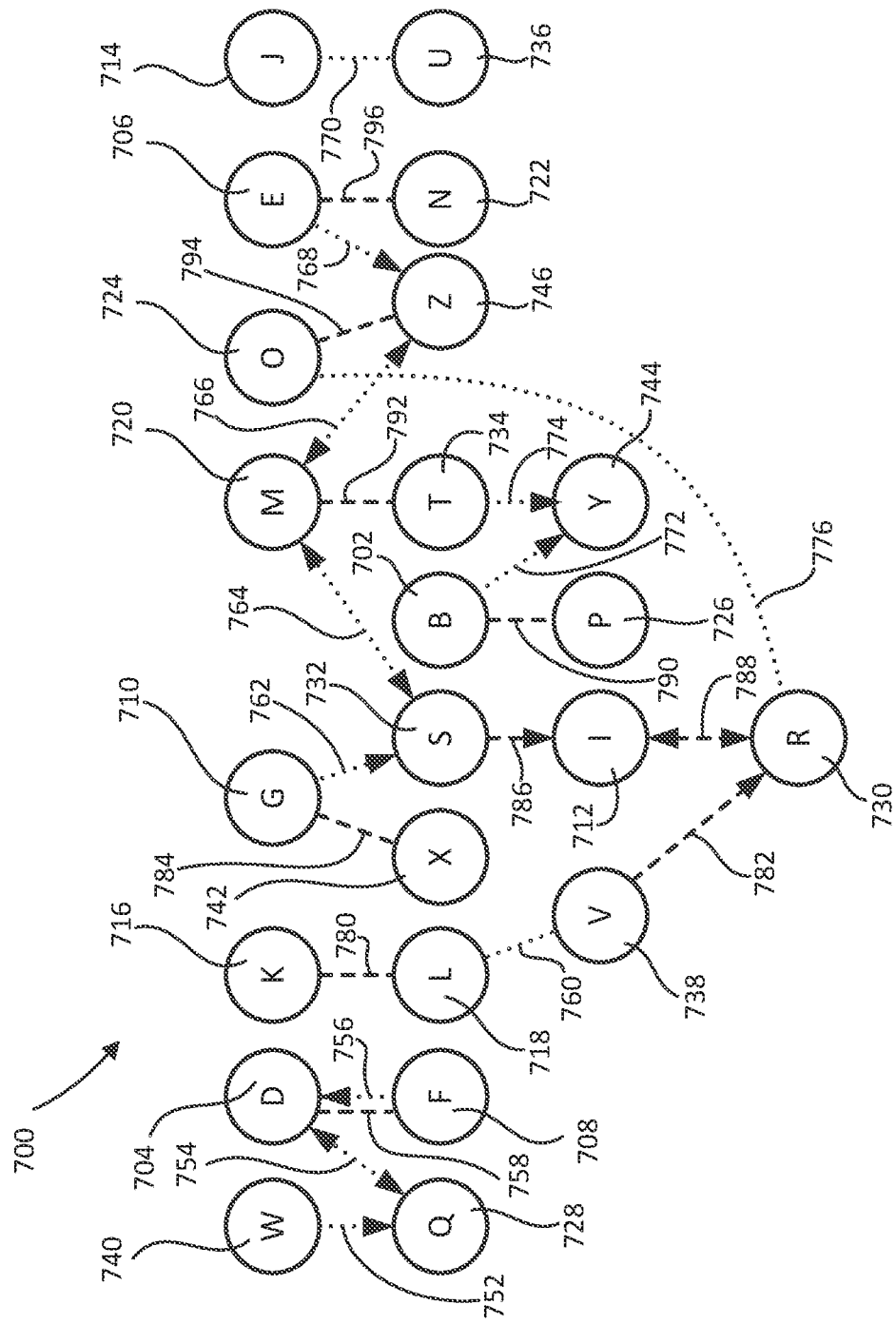
FIG. 7 is an example of known and unknown relationships between metrics discovered by the unsupervised learning process in FIG. 6.

FIG. 7 is a diagram of additional relationships discovered between different metrics for the colonoscopy procedure as well as already learned relationships. In this example, the input metrics correspond to the set of analytical engines 170a-170p shown in FIG. 1 and a number of additional input metrics that a user has input. The neural network analytical engines may be used to learn previously unknown relationships between the selected input metrics. FIG. 7 includes metrics relating to the surgical site infection rate where severity of illness = 1 (702), whether the provider is a critical care intensivist 24/7 (704), whether the facility has an integrated PET/CT system (706), whether the provider is a cytopathologist (708), the open procedure percentage for the provider (710), the surgical site infection rate where severity of illness = 2 (moderate) (712), whether the facility participates in STS General Thoracic Databases (714), the quality percentile of the provider (716), whether the provider is certified in stereotactic radiotherapy (718), whether the facility has a protocol for pathology reports (720), the cost percentile of the provider (722), whether the provider participates in multidisciplinary tumor conferences (724), the surgical site infection rate of the facility where severity of illness = 3 (major) (726), whether the provider is a member of the fellowship of trained interventional radiology physicians (728), the predicted result of surgical site infection rate where severity of illness = 1 (minor) based on adjusting on a what-if basis any or all of the associated metric values (730), whether the facility has a cervical mediastinoscopy system (732), the 30-day mortality rate where severity of illness = 1 (734), the cost rating of the provider as an aggregate of cost factors (736), the surgical site infection rate where severity of illness = 1 (minor) (738), the average number of cases per year per provider (740), whether the facility has an endobronchial ultrasound system (742), the 30-day mortality rate where severity of illness = 2 (moderate) (744) and the quality rating of the provider (746).

The initial set of engines relate to established relationships between the input metrics that may be determined statistically and used for training sets for supervised learning in FIG. 5. For example, the training set for teaching the analytical engines such 170a-170p may include a predetermined correlation between the average number of cases per year per provider and whether the provider has completed a fellowship of trained interventional radiology physicians (752). There may be a predetermined relationship between whether the provider has completed a fellowship of trained interventional radiology physicians and whether the provider is a critical care intensivist 24/7 (754). The relationship 754 is binary as the two metrics influence each other. Another relationship may be a correlation between whether the provider is a critical care intensivist 24/7 and whether the provider is a cytopathologist (756).

The unsupervised learning process in FIG. 6 may discover a previously unknown correlation (758) between whether the provider is a Cytopathologist and whether the provider is a Critical Care Intensivist 24/7.

Additional known correlations in FIG. 7 that may be the basis for supervised learning may include whether the provider is certified in stereotactic radiotherapy and the surgical site infection rate (760); the open procedure percentage for the provider and whether the facility has a cervical mediastinoscopy system (762); whether the facility has a cervical mediastinoscopy system and whether the facility has a protocol for pathology reports (764); whether the facility has a protocol for pathology reports and the quality rating (766); whether the facility has an integrated PET/CT scan system and the quality rating (768); whether the facility participates in STS General Thoracic Databases and the cost rating (770); surgical site infection rate and the 30-day mortality rate (772); and the 30-day mortality rate and 30-day mortality rate (774); and the predicted result of surgical site infection rate and whether the provider participates in multidisciplinary tumor conferences (776).

FIG. 7 shows a number of other previously unknown correlations between metrics that are discovered via the unsupervised learning process in FIG. 6. These correlations include a correlation between quality percentage and whether the provider is a member of the fellowship of trained interventional radiology physicians (780); a correlation between the surgical site infection rate and the predicted result of surgical site infection rate (782); a correlation between the open procedure percentage for the provider and whether the facility has an endobronchial ultrasound system (784); a correlation between having a cervical mediastinoscopy system and a moderate surgical site infection rate (786); a correlation between a surgical site infection rate and the predicted result of surgical site infection rate (788); a correlation between the surgical site infection rate where the severity of illness is minor and the surgical site infection rate where the severity of the illness is major (790); a correlation between whether the facility has a protocol for pathology reports and the 30-day mortality rate (792); a correlation between whether the provider participates in multidisciplinary tumor conferences and the quality rating (794); and whether the facility has an integrated PET/CT system and the cost percentile (796).

Figure 8:
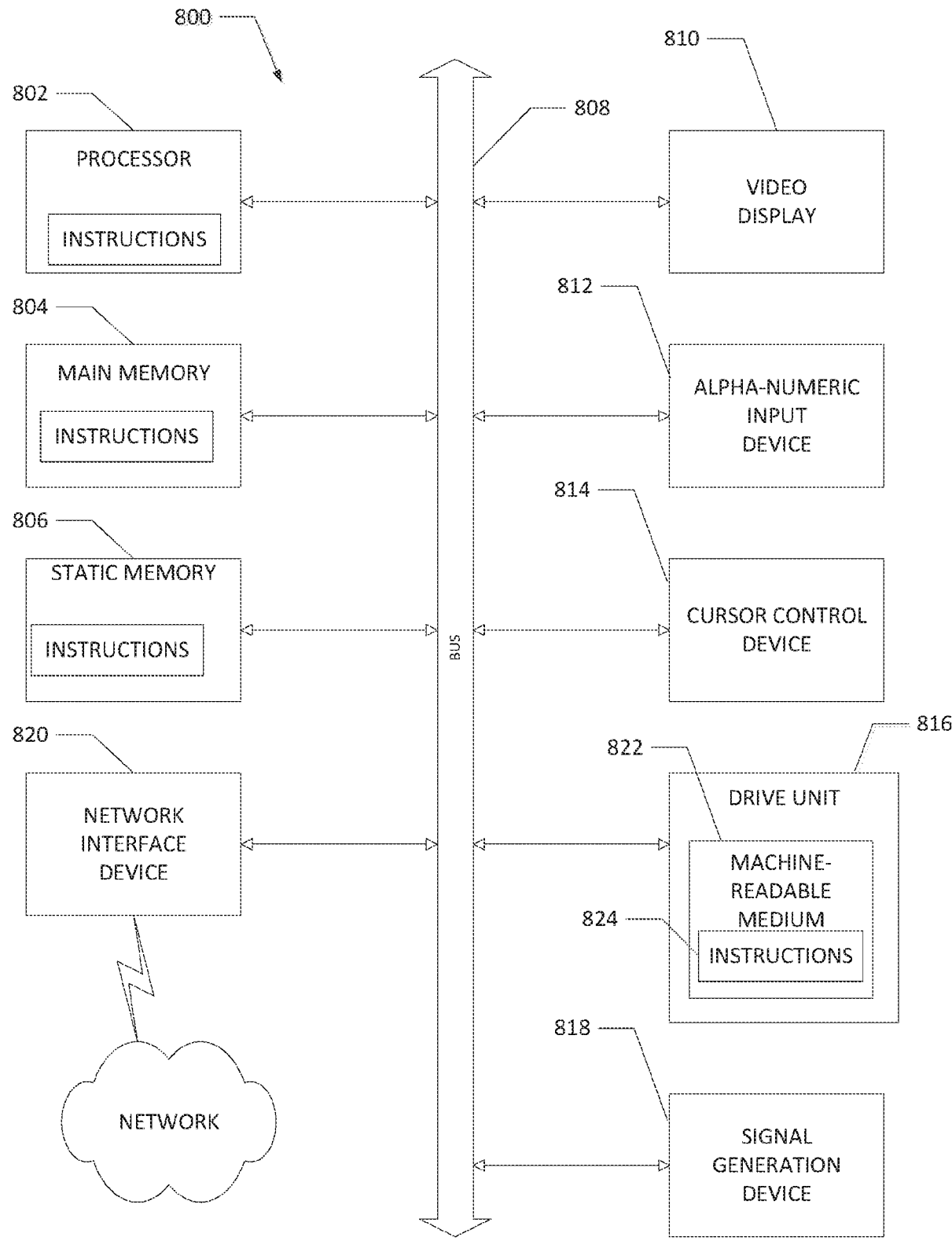
FIG. 8 is an example computing device for the example system in FIG. 1.

An example computer system 800 in FIG. 8 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker), and a network interface device 820.

The disk drive unit 816 includes a machine-readable medium 822 on which is stored one or more sets of instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network.

While the machine-readable medium is shown in an example to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding, or carrying a set of instructions for execution by the machine and that cause the machine to perform any one or more of the methodologies of the various embodiments, or that is capable of storing, encoding, or carrying data structures utilized by or associated with such a set of instructions. The term "machine-readable medium" can accordingly be taken to include, but not be limited to, solid-state memories, optical media, and magnetic media.

A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory.

The previous examples used a single adaptive learning algorithmic device based on a feed forward net to determine the target metrics. Supervised machine learning methodologies have been shown to be able to classify data in a variety of disciplines with a high level of accuracy. Artificial neural networks, the primary machine learning engine described above, are relatively crude electronic networks of neurons based on the neural structure of the brain. They process records one at a time, and learn in a largely random fashion by comparing their classification of each new data record with the known actual classification of the record from the original data set. The errors from the initial classification of the first record is in turn fed back into the network, and used to modify the neural network model prior to receiving the next set of data records.

However with limited data quantities and qualities available for some metric sets in the database 144, artificial neural networks are not necessarily the most efficient choice for determining the target metrics for the application 140. In developing a machine learning application for the selection algorithm for the engines in FIG. 1 that would create the most accurate and statistically rigorous target metrics possible, an enhancement to the originally designed feed-forward neural network metric targeting application involves selection between multiple learning algorithms to determine each of the specific target metrics. Such a method allows for increased flexibility in classifying surgical targets and weights by metric sets. For example, nine different machine learning algorithms may be incorporated into the modules for determining target metrics. Such algorithms are then scored on an equal, competitive basis to determine the optimal target classification model for each metric within each metric set for a given surgical procedure. The competitive scoring algorithm scores the output provided by each machine learning algorithm based on a rigorous set of statistical techniques, using the actual metric data in the database relating to practitioners and facilities as the basis for the scoring.

The system 100 in FIG. 1 would thus store different selection algorithms in the selection application 140 using a method with multiple machine learning algorithms. The system 100 shown in FIG. 9 using alternate machine learning algorithms other than the feed forward neural network for determining the target metrics for the evaluations made by the system 100 in FIG. 1. Different machine learning algorithms other than the example feed forward neural network explained above could be used to determine each of the target metrics for each of the surgical procedures based on the evaluation of each of plurality of possible machine learning algorithms. Thus, for evaluation of a provider of a lung cancer resection procedure, target metric engines 950*a*-950*o* are used to determined target metrics which correspond to the metrics determined by the engines 150*a*-150*o* in FIG. 1. In this example, one target metric is determined by a first learning algorithm such as a multilayer perceptron feed forward neural net for the engine 950*a*. In this example, the first target metric is surgical site infection rate where severity of illness = 1 and is determined by the feed forward neural net machine learning algorithm. A second target metric such as the rate of discharge to home where severity of illness is moderate, is determined by a second type of machine learning algorithm such as a Least Angle Regression (LARS) engine 950*b*.

In this example, all of the target metrics have corresponding machine learning algorithms run by the engines 950*a*-950*o* that are selected from nine available machine learning algorithms based on a competitive method explained below.

Another set of twenty analytical engines 960*a*-960*t* corresponding to metrics determined by the engines 160*a*-160*t* in FIG. 1 is used for the evaluation of a provider of a roux en Y bypass procedure. The twenty different metrics are determined from corresponding machine learning algorithms run by the engines 960*a*-960*t* that are selected from the nine available machine learning algorithms. The type of machine learning algorithm selected may be different depending on the type of surgical procedure. For example, the same metric such as surgical site infection rate where severity of illness = 1 may be used for the lung cancer resection and roux en Y bypass procedures, but a different learning algorithm 960*a* may be determined to be more accurate to determine the target metric in the roux en Y bypass procedure as opposed to the feed forward neural net algorithm 950*a* used to determine the target metric in the lung cancer resection procedure. In evaluating a colonoscopy procedure, the sixteen different metrics are determined from corresponding learning algorithms run by engines 970*a*-970*p* corresponding to the engines 170*a*-170*p* in FIG. 1 that are selected from the nine available machine learning algorithms in this example.

The technique of using multiple machine learning methodologies and have them compete against each other compensates for deficiencies in a particular learning methodology in determining a target metric. For example, the feed forward neural network machine learning application described above successfully generates accurate targets (as measured by statistical techniques) approximately 75% of the time, which were also within tight variance ranges for the existing literature-based surgical metric targets.

The remaining 25% of the metrics within each of the metric sets were shown to be generating results that were not in alignment with the existing literature-based targets. To address this issue, additional machine learning techniques were adopted and incorporated into the metric target determination system. These other machine learning algorithms extract imputed data with the automated variable selection, outlier detection and error correction processes previously described above. They then each conduct separate training iterations against each target metric for each metric set for a particular surgical procedure.

The nine machine learning algorithms in this example include: 1) memory based reasoning; 2) a CHAID decision tree; 3) a feed-forward auto neural network; 4) a neural network with a gradient boosting process; 5) a data mining neural network that has been modified to have adaptive non-linear functionalities; 6) a regression algorithm; 7) a partial least squares algorithm; 8) a least angle regression algorithm; and 9) a neural network. The regression algorithm and partial least squares algorithm are mathematical (stochastic) forecasting/categorizing techniques included for baseline performance estimation purposes.

These machine learning models and the baseline techniques are incorporated into the overall machine learning system and run in parallel against all target values for each metric set for each surgical procedure. A competitive scoring routine that utilizes a series of validation calculations statistically analyzes the results from each of the techniques and compares the generated target values against patterns that were detected in the original data. The best set of targets chosen by each machine learning algorithm are then examined and the best set of targets is selected as the recommended target for a given metric within a metric set and the machine learning algorithm associated with the best set of targets is used for that metric.

Figure 9:
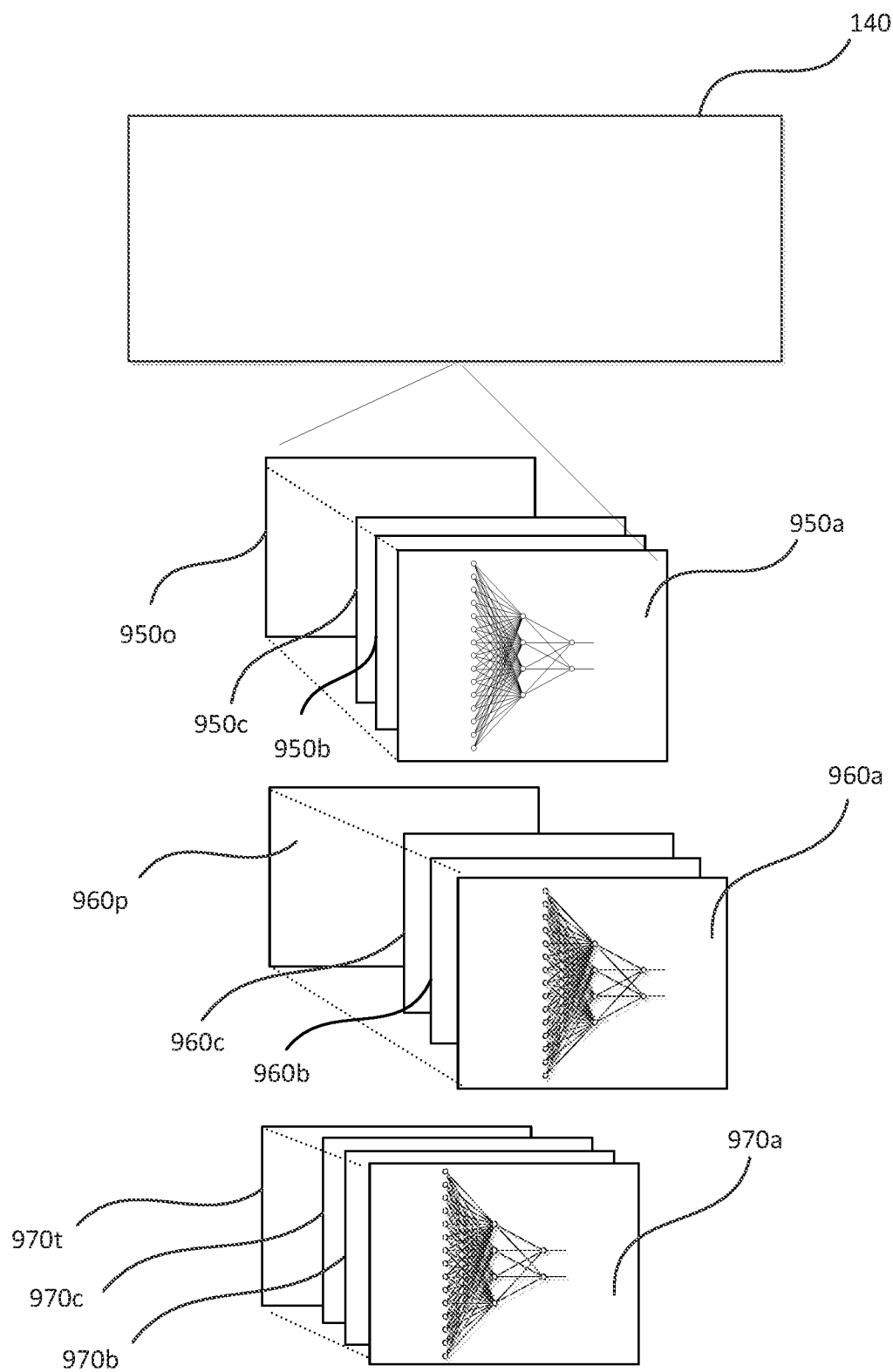
FIG. 9 is a block diagram illustrating the sources of data and the extraction, transformation, and loading flow of the data into another system for providing evaluation of health care services using different learning algorithms to determine target values.
Figure 10:
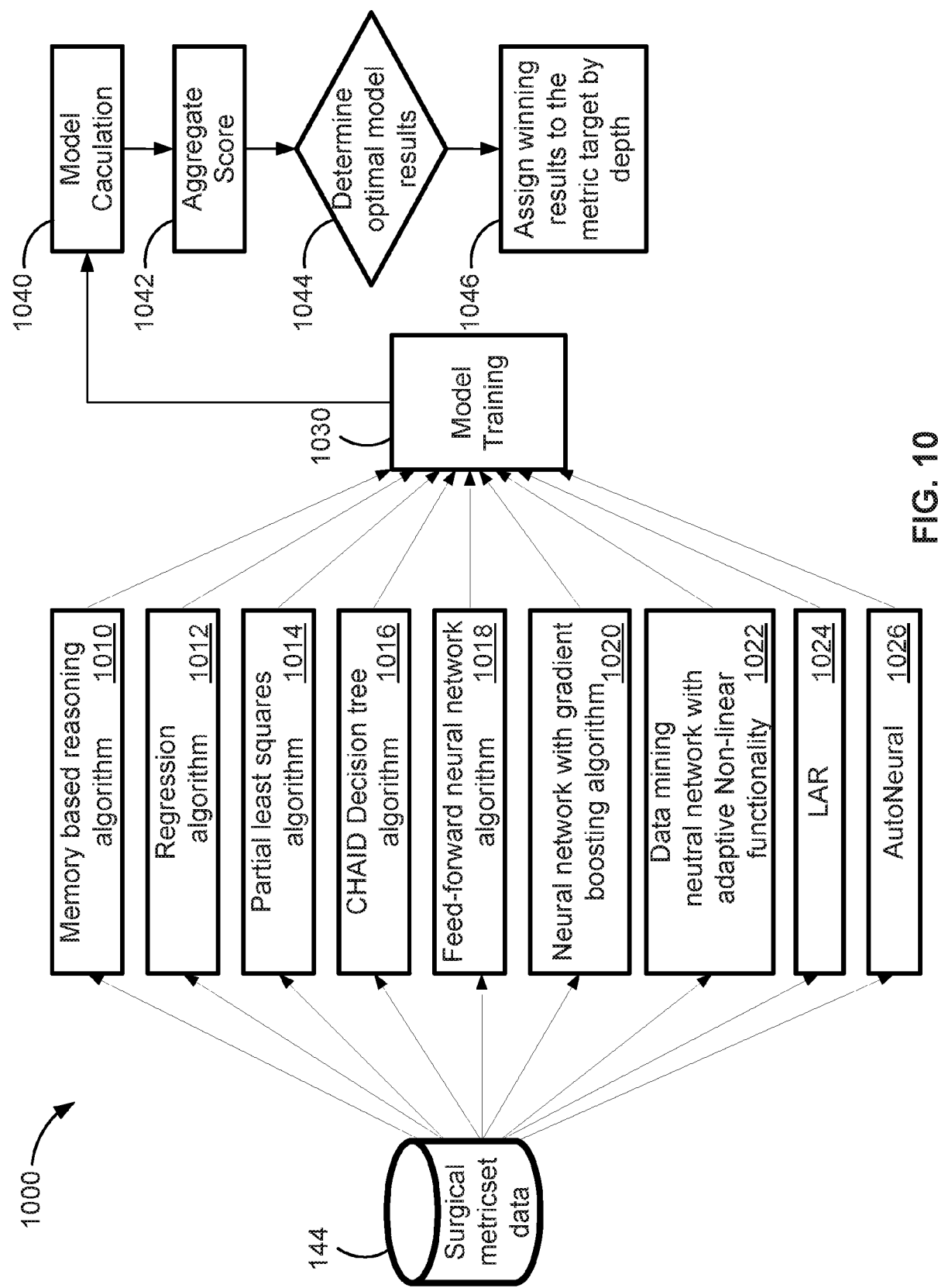
FIG. 10 is a block diagram of a scoring system used to select the most accurate machine learning algorithms for determining each target metric in the system in FIG. 9.

FIG. 10 is a block diagram of a scoring system 1000 for selecting the most appropriate machine learning algorithm for a particular metric in the metric sets for each of the procedures analyzed in the system in FIG. 9. FIG. 10 includes the data that is stored in the metric set data relating to different procedures and metrics associated with the procedures, health care providers and procedure providing facilities. The metric set data is connected to the nine different algorithms that include a memory based reasoning algorithm 1010, a regression algorithm 1012, a partial least squares algorithm 1014, a CHAID decision tree algorithm 1016, a feed-forward neural network 1018, a neural network with a gradient boosting process algorithm 1020, a data mining neural network that has been modified to have adaptive non-linear functionalities 1022, a partial least angle regression algorithm 1024, and a autoneural network algorithm 1026.

The algorithms all are trained using a model training set 1030. The model training set 1030 is a selected set of values from the database of all metric values relating to different surgical procedures. The trained algorithms are then used to determine target values in a model calculation module 1040. The scores produced by the trained algorithms are aggregated (1042). The optimal model results are determined (1044). The winning results are assigned to the metric target for the analysis (1046).

The scoring system 1000 produces a composite grade assessment of the new target projection for each machine learning algorithm employed against each surgical metric set projection. Each of these composite grade assessments is based on a metric target projection by each of the machine learning algorithms 1010, 1012, 1014, 1016, 1018, 1020, 1022, 1024 and 1026 against the existing actual data in the metric set for each type of surgery, arranged by provider and summarized by facility.

The winning machine learning algorithm selected for each metric target in each metric set is then used to provide the new metric target or metric target ranges for the evaluation system such as the system in FIG. 1. In the case of a metric target that consists of multiple ranges such as the "open procedure percentage" or the various length of stay metrics, the depth of the various data points provided by the winning model are used to define the multiple target ranges for that metric in a specific metric set.

In all of the scoring competition techniques, the values shown indicate the level of randomness present in each of the machine learning algorithms, and therefore the goal of the scoring engine is to select the optimal machine learning algorithm for a specific metric target in each metric set which has the lowest aggregate score value.

To provide a comparative level of confidence in the new targets, a statistical t-test calculation can then be produced, which compares each of the new metric targets produced by the different machine learning algorithms against the existing literature-based metric targets. This technique is used to determine if a mean value in a dataset differs significantly from a hypothesized target value. It is driven by measuring the strength of the "signal" in the dataset against the variation in the "noise" or variation within the dataset, and comparing it to the t-test score value of the new metric target. It can be described as a signal-to-noise ratio calculation comparing two sets of targets in the case of this application.

The scoring of the competition between the different machine learning algorithms utilizes a scoring engine function that utilizes the Average Squared Error, the Model Degrees of Freedom, Akaike's Information Criterion, the Maximum Absolute Error and the Root Average Squared Error values derived from the data. The Average Squared Error calculation is a statistical calculation that measures the mean of the square of the deviations between an output projection and the original values present in the surgical metric set data. The Model Degrees of Freedom calculation value refers to the number of independent observations in a sample minus the number of population parameters that must be estimated from sample data.

Akaike's Information Criterion (AIC) is a calculation which can measure the quality of each model relative to the other models by providing an estimate for the information lost when the selected model is used to represent the process that provided the original actual values. The Akaike's Information Criterion (AIC) (Akaike, 1973, 1977) is a measure of the goodness of fit of an estimated statistical model. AIC uses the log likelihood function for a model with k parameters to select models, choosing the model that maximizes 2(LL − k) or the model that minimizes −2(LL + k), where LL is the log-likelihood term and k is a parameter term. Smaller AIC values indicate better models. AIC values can become negative. The log-likelihood term, LL, increases in value as variables are added to the model, the parameter term, k, also increases in magnitude to counteract the log-likelihood term increase, a bias-variance tradeoff. AIC is based on the Kullback-Leibler (1951) information measure of discrepancy between the true distribution of the random variable and that specified by the model. AIC utilizes elements of degrees of freedom (the number of estimable parameters) and the log-likelihood of the maximum point of the model estimate as the basis for its equations.

The Maximum Absolute Error is the largest error shown within each model out of each prediction data point generated when compared to the counterpart value in the actual values in the metric set data. The Root Average Squared Error, or RMSE, value shows the measure of the differences between values in the prediction model compared to the actual dataset values. The RMSE represents the sample standard generating the individual residual errors from the model calculations and compared to the original dataset values. This generates a prediction error value and is useful for measuring relative accuracy or the predictive power of a given machine learning algorithm model in comparing errors for a specific metric target or target range.

As explained above, a competitive scoring routine utilizes this series of validation calculations to statistically analyze the results from each of the machine learning techniques and compare the target values against patterns that were detected in the original data. The overall objective is to competitively measure the projected metric targets and classification ranges of each machine learning model against statistically measurable random effects in the data set. The sum of these distinct score values is used to select the optimal machine learning model for each particular metric within a metric set for a procedure.

In all of the above scoring competition techniques, the values shown indicate the level of randomness present in each of the machine learning algorithms, therefore the goal of the scoring engine is to select the optimal machine learning algorithm for a specific metric target in each metric set which has the lowest aggregate score value, thus indicating that the champion machine learning model has the least amount of random effects present in its target or target range classification.

FIGS. 11A and 11B are a table of the comparison metrics in relation to values that are generated by the supervised machine learning application's competitive scoring algorithm. The resulting values are used to indicate the recommended (winning) model, which in this example is the AutoNeural need-forward neural network algorithm based on the average squared error measurement. The table in FIGS. 11A and 11B show the comparative fit statistics provided for each of the nine machine learning algorithms in competition in this example. The key fit statistics used for comparison scoring are the Akaike's Information Criterion, Maximum Absolute Error, Sum of Squared Errors and the Root Average Squared Error of each model. The values for the key fit statistics are entered in each column corresponding to the row of the compared machine learning algorithm.

In FIGS. 11A and 11B, among the fit statistics that are utilized in scoring the models include the following statistical measures, the primary measure is the Average Squared Error (also known as the Mean Squared Error or MSE) which is defined as the average of the squares of the errors or deviations-that is, the difference between the estimator (machine learning algorithm output) and what is estimated (the original actual dataset values). This is the primary scoring mechanism which is used to measure the fidelity of each machine learning algorithm's predictive model against the information contained in the original actual dataset. In cases where there is a tie or data is unavailable for the average squared error, the other fit statistics descried above are used to score the models. In some cases, not all of the fit statistics will be produced by a particular machine learning algorithm, depending on the quality and type of data.

As explained above, there are nine machine learning algorithms that are evaluated for each target metric in this example. Of course there may be more or fewer algorithms that may be evaluated by the scoring system in FIG. 10 to determine optimal machine learning algorithms for deployment in the metric determination engines in the system in FIG. 9.

A first machine learning algorithm is regression analysis, a stochastic method that uses an identity link function and a normal distribution error function to generate a linear regression. The Regression model uses either a logit, complementary log-log, or probit link function and a binomial distribution error function for a logistic regression analysis, which is a regression calculation in which categorical information is used as the dependent variable that targets or target ranges are generated. The Regression model supports binary, interval, nominal, and ordinal type target variables, while input variables can be continuous (interval) or discrete (binary, nominal, or ordinal). This methodology utilizes backward elimination as part of the machine learning model. In a backward elimination technique, the independent variable permutations are each entered into the equation and then sequentially removed. The variable with the smallest partial correlation with the dependent target variable is considered first for removal. If it meets the criterion for elimination, it is removed. After the first variable is removed, the variable remaining in the equation with the smallest partial correlation is considered next. The procedure stops when there are no variables in the equation that satisfy the removal criteria.

A second machine learning algorithm is based on Least Angle Regression (LARS), a methodology that was introduced by Efron et. al (2004), that produces a sequence of regression models. One model parameter is added with each step as will be explained below.

The LAR machine learning algorithm starts by centering the covariates and response. Then the covariates are scaled so that they all have the same corrected sum of squares. Initially all coefficients are zero, as is the predicted response. The predictor that is most correlated with the current residual is identified, and a step is taken in the direction of this predictor. The length of the step determines the coefficient of this predictor. The step length is chosen so that some other predictor and the current predicted response have the same correlation with the current residual.

At this point, the predicted response moves in the direction that is equiangular between these two predictors. Moving in the equiangular direction ensures that the two predictors continue to have a common correlation with the current residual. The predicted response moves in this direction, until a third predictor has the same correlation with the current residual as the two predictors that are already in the model. A new direction is determined that is equiangular between these three predictors. The predicted response moves in this direction until a fourth predictor that has the same correlation with the current residual joins the set. This process continues until all predictors are in the model.

A third algorithm is an AutoNeural network algorithm. This methodology can create different types of feed forward network architectures utilizing various activation functions. Each activation function and target function contains a bias weight that is also optimized. At each step, a new network model is optimized using an iterative nonlinear solution. Multiple candidate activation functions are optimized and then the best ones are retained in the model.

MLP (Multi-Layer Perceptron) networks created using this methodology are generally not interpretable due to the highly nonlinear nature of combinations of activation functions. In a single hidden layer network, new hidden neuron units are added one at a time and are selected according to which activation function provides the most benefit. Many models may be successfully fit with a single hidden layer.

A fourth machine learning algorithm is based on a Decision Tree algorithm. This methodology creates an empirical tree which represents a segmentation of the data that is created by applying a series of simple rules determined by the algorithm. Each rule assigns an observation to a segment based on the value of one input. One rule is applied after another, resulting in a hierarchy of segments within segments. The hierarchy is termed as a tree, and each segment is termed a node. The original segment contains the entire data set and is termed the root node of the tree. A node with all its successors forms a branch of the node that created it. The final nodes are termed as leaves. For each leaf, a decision is made and applied to all observations in the leaf. The type of decision depends on the context. In predictive modeling, the decision is the predicted value.

The Decision Tree algorithm creates trees that do one of the following tasks: a) classify observations based on the values of nominal, binary, or ordinal targets; b) predict outcomes for interval targets; and c) predict the appropriate decision when you specify decision alternatives.

An advantage of the Decision Tree node over other modeling nodes, such as the Neural Network node, is that it produces output that describes the scoring model with interpretable Node Rules. The Decision Tree node also produces detailed score code output that completely describes the scoring algorithm in detail. For example, the Node Rules for a model might describe a rule such as "If annual provider patient volume for a given procedure is less than 30% and reinfections for moderate severity of illness is less than 10%, then then classify this provider as high quality."

Another advantage of the Decision Tree node is the treatment of missing data. The search for a splitting rule uses the missing values of an input. Surrogate rules are available as backup when missing data prohibits the application of a splitting rule.

Generally, effective decision tree classification models require a sufficient number of data records in order to accurately determine rank classifications and categories, as well as a sufficient level or well correlated (as measured by $R^2$) multidimensional input data. Smaller data sets and/or data without well correlated multidimensional inputs can result in poor classifications which may not concur with multivariate classifications determined by other machine learning methodologies (Morgan, et. al, 2003). The decision tree algorithms increase effectiveness with more data stored in the database.

A fifth machine learning algorithm is the data mining neural network. The data mining neural network executed on a machine learning module fits an adaptive non-linear model that uses bucketed principal components as inputs to predict a binary or an interval target variable. Bucketed principal components is a statistical analysis technique that attempts to resolve some of the key issues of multidimensional data modeling due to the exponential increase in the size of the number of factors reducing the sparsity of the available data set for numerical analysis. Bucketed principal components attempt to address the high-dimensionality concern in a non-linear regression modeling framework. This is accomplished by using an independent linear combination of independent variables that is able to sufficiently explain the variability found in the data set. The algorithm used in training of the data mining neural network addresses issues of non-linear estimation, computing time and finding a global optimal solution from common neural networks for data mining purposes. These issues are likely to occur with a neural net especially when the data set contains highly collinear variables.

The nonlinear estimation problem in common neural networks is seriously underdetermined, which yields to highly rank-deficient Hessian matrices and results in extremely slow convergence of the nonlinear optimization algorithm. In other words, the zero eigenvalues in a Hessian matrix correspond to long and very flat valleys in the shape of the objective function. The traditional neural network approach has serious problems to decide when an estimate is close to an appropriate solution and the optimization process can be prematurely terminated. This is overcome by using estimation with full-rank Hessian matrices of a few selected principal components in the underlying procedure of the data mining neural nets.

Another issue is the computing time required by a common neural network. Each function call in common neural networks corresponds to a single run through the entire training data set. Normally, many function calls are therefore needed for convergence of the nonlinear optimization. This requires a tremendous calculation time to obtain an optimized solution for data sets that have a large number of observations. In data mining neural network training of the data mining neural node, a set of grid points is obtained from the selected principal component and a multi-dimensional frequency table is obtained from the training data set for nonlinear optimization. In other words, segments of the data are trained instead of the entire data, and the computing time is reduced dramatically.

Another issue is finding a global optimal solution with a common neural network. Common neural network algorithms often find local rather than global optimal solutions and the optimization results are very sensitive with respect to the starting point of the optimization. However, the data mining neural network training can find a good starting point that is less sensitive to the results, because it uses well specified objective functions that contain a few parameters and can do a very simple grid search for the few parameters.

In the data mining neural process, a principal components analysis is applied to the training data set to obtain a set of principal components. Then a small set of principal components is selected for further modeling. This set of components shows a good prediction of the target with respect to a linear regression model with an R2 selection criterion. The algorithm obtains a set of grid points from the selected principal component and a multidimensional frequency table from the training data set. The frequency table contains count information of the selected principal components at a specified number of discrete grid points.

In each stage of the data mining neural training process, the training data set is fitted with eight separate activation functions. The data mining neural node selects the one that yields the best results. The optimization with each of these activation functions is processed independently.

A sixth machine learning algorithm is a feed forward neural network consisting of units (neurons) and connections between those units as explained with reference to FIG. 4 above. There are three kinds of units, input units, hidden units and output units. Input units obtain the values of input variables and optionally standardize those values. Hidden units perform internal computations, providing the nonlinearity that makes neural networks powerful. Output units compute predicted values and compare those predicted values with the values of the target variables. Units pass information to other units through connections. Connections are directional and indicate the flow of computation within the network. Connections cannot form loops in feed forward networks.

In the example, in FIG. 4, input units can be connected to hidden units or to output units and hidden units can be connected to other hidden units or to output units. Output units cannot be connected to other units. Each unit produces a single computed value. For input and hidden units, this computed value is passed along the connections to other hidden or output units. For output units, the computed value is a predicted value as defined by statistics. The predicted value is compared with the target value to compute the error function, which the training methods attempt to minimize. Most connections in a network have an associated numeric value called a weight or parameter estimate. The training methods attempt to minimize the error function by iteratively adjusting the values of the weights. Most units also have one or two associated numeric values called the bias and altitude, which are also estimated parameters adjusted by the training methods.

Hidden and output units use two functions to produce their computed values. First, all the computed values from previous units feeding into the given unit are combined into a single value using a combination function. The combination function uses the weights, bias, and altitude. Two general kinds of combination functions are commonly used. Linear Combination Functions compute a linear combination of the weights and the values feeding into the unit and then add the bias value (the bias acts like an intercept). Radial Combination Functions compute the squared Euclidean distance between the vector of weights and the vector of values feeding into the unit and then multiply by the squared bias value (the bias acts as a scale factor or inverse width).

The value produced by the combination function is transformed by an activation function, which involves no weights or other estimated parameters. Several general kinds of activation functions are often utilized, with most of the metric sets in the example system in FIG. 9, (using a unique model diagram dedicated to each metric set) is the Sigmoid Function. The list of utilizable activation functions in this methodology includes identity functions, sigmoid functions, Softmax functions, value functions and exponential and reciprocal functions. An Identity Function is also called a linear function. It does not change the value of the argument, and its range is potentially is unbounded. Sigmoid Functions are S-shaped functions such as the logistic and hyperbolic tangent functions that produce bounded values within a range of 0 to 1 or -1 to 1. A Softmax Function is called a multiple logistic function by statisticians and is a generalization of the logistic function that affects several units together, forcing the sum of their values to be one. Value Functions are bounded bell-shaped functions such as the Gaussian function. Exponential and Reciprocal Functions are bounded below by zero but unbounded above.

A network may contain several hundred or more units. The units are grouped into layers to make them easier to manage. The selection application 140 in FIG. 1 supports an input layer, a hidden layer, and multiple output layers. In this application, every unit in the first layer is connected to every unit in the second layer. All the units in a given layer share certain characteristics. For example, all the input units in a given layer have the same measurement level and the same method of standardization. All the units in a given hidden layer have the same combination function and the same activation function. All the units in a given output layer have the same combination function, activation function, and error function. In contrast to the auto neural network, the feed forward neural network will automatically generate a single hidden layer network. The auto neural network provides an algorithm for building a multilayer neural network, as well as a single layer, cascade, block etc. neural network where most appropriate as defined by the algorithm.

The seventh machine learning algorithm is the memory-based reasoning (MBR) process that identifies similar cases and applies the information that is obtained from these cases to a new record. The Memory-Based Reasoning (MBR) algorithm used by the example application 140 in FIG. 9 uses a k-nearest neighbor algorithm to categorize or predict observations. The k-nearest neighbor algorithm takes a data set and a probe, where each observation in the data set is composed of a set of variables and the probe has one value for each variable. The distance between an observation and the probe is calculated. The k observations that have the smallest distances to the probe are the k-nearest neighbor to that probe.

In the example algorithm implementation of MBR, the k-nearest neighbors are determined by the Euclidean distance between an observation and the probe. Based on the target values of the k-nearest neighbors, each of the k-nearest neighbors votes on the target value for a probe. If the target is an interval type of data variable, then the average of the target values of the k-nearest neighbors is calculated as the prediction for the probe observation.

FIGS. 12A and 12B are tables produced by the memory based reasoning model in relation to the case volume metric that may be a target metric for several of the surgical procedure evaluations. The votes by the MBR algorithm are for the posterior probabilities, which indicate the likelihood that the hypothesis (metric target accuracy against a random value) is correct based on the available observations in the data set, for the classification target variables.

One simple example of the machine based reasoning voting approach of these neighbors could be for a classification target variable when different values of k are specified as shown in the table in FIG. 12A. In this example there are three columns, the Provider ID, the Case Volume, and an Observation Ranking based on Distance to the Probe. The Provider ID represents the health care provider. The metric examined in this case is Case Volume, the number of cases performed by the corresponding health care provider. The MBR algorithm assigns a ranking value to each of the provider records based on the Euclidean distance between observations (k-nearest neighbor). In this example, observation records for provider IDs 7, 12, 35, 108, and 334 are the five closest observations to the probe. Providers 108 and 35 have the shortest and the longest distances to the probe, respectively.

In FIG. 12A, the k-nearest neighbors are first k observations that have the closest distances to the probe. If the value of k is set to 3, then the target values of the first three nearest neighbors (108, 12, and 7) are used. The target values for these three neighbors are Y, N, and Y. Therefore, the posterior probability for the probe to have the target value Y is $\frac{2}{3}$ (67%).

FIG. 12B is a table that shows that in the application 140 described above, a k-nearest neighbor score of k=1 provides the high-quality metric target score, while a k-nearest neighbor score of k=2 provides the mid-point score target range (assuming that MBR is the winning machine learning algorithm classification model for a given metric in a metric set).

An eighth machine learning algorithm is Gradient Boosting. The gradient boosting is a partitioning algorithm described in "A Gradient Boosting Machine," and "Stochastic Gradient Boosting" by Jerome Friedman (2001, 2002). A partitioning algorithm is one that searches for an optimal partition of the data defined in terms of the values of a single variable. The optimality criterion depends on how another variable, the target, is distributed into the partition segments. The more similar the target values are within the segments, the greater the worth of the partition. Most partitioning algorithms further partition each segment in a process called, recursive partitioning. The partitions are then combined to create a predictive model. The model is evaluated by goodness-of-fit statistics defined in terms of the target variable. These statistics are different than the measure of worth of an individual partition. A good model may result from many mediocre partitions.

Gradient boosting is a boosting approach that resamples the analysis data set several times to generate results that form a weighted average of the re-sampled data set. Tree boosting creates a series of decision trees which together form a single predictive model. A tree in the series is fit to the residual of the prediction from the earlier trees in the series. The residual is defined in terms of the derivative of a loss function. For squared error loss with an interval target the residual is simply the target value minus the predicted value. Each time the data is used to grow a tree and the accuracy of the tree is computed. The successive samples are adjusted to accommodate previously computed inaccuracies. Because each successive sample is weighted according to the classification accuracy of previous models, this approach is sometimes called stochastic gradient boosting. Boosting is defined for binary, nominal, and interval targets.

Like decision trees, boosting makes no assumptions about the distribution of the data. For an interval input, the model only depends on the ranks of the values. For an interval target, the influence of an extreme value theory depends on the loss function. The Gradient Boosting node offers a Huber M-estimate loss which reduces the influence of extreme target values. Boosting is less prone to overfit the data than a single decision tree.

The final learning machine algorithm in this example is Partial Least Squares, a stochastic method that analyzes one target variable and produces a standard predictive model assessment result. Data mining problems that might traditionally be approached using multiple linear regression techniques become more difficult when there are many input variables or there is significant collinearity between variables. In these instances, regression models tend to overfit the training data and do not perform well when modeling other data. Often this is the case when just a few latent variables among the many input variables are responsible for most of the variation in response or target variable values.

Partial least squares is a methodology that is useful for extracting the latent input variables that account for the greatest variation in the predicted target. Partial least squares is useful for identifying latent variables from a large pool. But the analytical results of the partial least squares tool are not useful for identifying variables of minor or no importance. It is difficult to identify the weighting of the latent input predictor variables that partial least squares uses, because they are based on cross-product relations with the target variable instead of the covariances between the input variables themselves as is more commonly seen in common factor analysis.

The partial least squares algorithm is a multivariate extension of a multiple linear regression that was developed by Herman Wold (Gerlach, et. al, 1979) in the 1960s as an econometric technique. Since then, partial least squares has been widely used in industrial modeling and process control systems where processes can have hundreds of input variables and scores of outputs such as in data mining projects for marketing, social sciences, and education.

The partial least squares algorithm reduces the set of variables (both input and target) to principal component matrices. The input variable components are used to predict the scores on the target variable components, and then the target variable component scores are used to predict the value of the target variable.

Upon the successful selection of the most appropriate predictive model for an individual metric within a metric set, the output for that given predictive model is produced in a tabular format that can be sent as output to the database or written to a file. An example of a comparative model output by Predicted Values by Depth is shown in FIG. 13A. FIG. 13A is a graph that shows the results of nine separate predictive models utilizing machine learning algorithms for the metric average number of cases per year per provider, a metric from the metric set for evaluating the Cholecystectomy procedure. Each of the machine learning algorithms is represented by a plot line 1310. The "winning" model (based on the MSE score value) is the AutoNeural feed-forward neural network model. Data points 1320 of the AutoNeural model are shown alongside the plot lines 1310 of the other predictive models that were not chosen.

In FIG. 13A, a selection depth (Tukey Depth) of 25 was generally used for the inflection point as the upper bound classification target range, representing the Tukey Depth at which upper-bound classifier analysis was associated, see Gilad-Bachrach, R., & Burges, C. J. (2013). The upper or lower bound selection Tukey Depth could be adjusted if the Depth value was not aligned with the MBR k-1 and k-2 predicted value, which generally served as the upper-boundary cutoff confirmation point ranges. Likewise, lower-bound classifier analysis was typically associated with a selection located at a Tukey Depth range of 80. The k-1 and k-2 predictors generally (but not exclusively) of the MBR methodology coincided approximately with the inflection point floor values in the selected winning model for the upper boundary inflection point and served as an informal confirmation tool. For the predictor and depth plots shown in FIG. 13A, the Tukey Depth is defined as the minimum number of sample points of one side of a hyperplane through a given point. Highlights of this predictive model include the Upper-Bound Multicomponent Selection highlighted by a box 1330 and the Lower-Bound Multicomponent Selection highlighted by a box 1332. The box 1330 thus shows the upper-bound target ranges, which are clustered around the Tukey Depth (x-axis on the chart) from 0 to 25. The midvalue "inflection point" is the clustering midpoint at the Tukey Depth of 25, and is confirmed by the presence of the MBR prediction trendline which generally highlights the midpoint ranges in these datasets as shown in the box 1332, which coincides with the AutoNeural prediction at the depth range of 25. The Memory-Based Reasoning selection represented by a box 1334 demonstrates the boundary between the upper and lower bounds for the selection criteria, and the mid-value inflection point for this metric. The lower-bound target range is above the depth of 25 to the final depth of 100 as shown in the box 1334.

Thus, for metrics that require multiple target ranges, the Tukey Depth is utilized to define upper and lower boundaries, with clustering utilized on either the upper-bound or lower-bound Depth, with ranges above the cluster being optimal (or poor), within the cluster as moderate and below the cluster being poor (or optimal). Poor or optimal above or below the cluster depends on the known (supervised) nature of the specific metric in question.

In a rare condition in which no statistical change detection between classifier metric targets existed between the upper-bound or lower-bound Tukey Depth ranges for the selected winning model, the next ranking model is selected to provide that single classifier data point which existed at that specific depth range. FIG. 13B is a graph that shows a relatively rare outlier occurrence in which no statistical change detection exists for the lower-bound classifier Tukey Depth within the selected optimal predictive model. FIG. 13B shows a series of plot lines 1350 representing the calculation of a target metric by the example nine machine learning algorithms. In this example, the Decision Tree data point is used as the next-closest winning bid that provided a viable statistical change detection at that depth level. The specific depth range is represented by a box 1360. In such a condition, a secondary statistical confirmation process is conducted to provide a verification checkpoint for that classifier selection. A confirmation technique is used for this supervised machine learning process, in addition to the use of existing literature based metric targets that were used as an indicator gauge to validate that the new metric target calculations were behaving appropriately within an expected range framework.

The categorical analysis tabulates and summarizes categorical response data, including multiple response data, and calculates test statistics based on a factor analysis. A factor analysis is a statistical methodology which is utilized to describe the variability among a set of correlated dimensional variables, seeking to determine the potential existence of an undiscovered set of variables implied in the data which are referred to as factors.

For example, it is possible that variations in six observed variables mainly reflect the variations in two unobserved (underlying) variables. Factor analysis searches for such joint variations in response to unobserved latent variables. The observed variables are modeled as linear combinations of the potential factors, along with a set of "error" terms representing uncertainty. Factor analysis ultimately looks for independent dimensions that can best explain the events shown in the actual data set. FIG. 13C is a chart that shows the result of factor analysis that may serve as the secondary statistical confirmation process conducted to provide a verification checkpoint for that classifier selection in the rare condition where no there is no statistical change as shown in FIG. 13B. An example of a relatively rare outlier occurrence in which no statistical change detection exists for the lower-bound classifier Tukey Depth within the selected optimal predictive model as shown in FIG. 13B. In this instance, the Decision Tree data point is used as the next-closest winning bid that provided a viable statistical change detection at that depth level.

The strength of this categorical response platform is that it can handle responses in a wide variety of formats without needing to reshape the data. It is designed to handle categorical response data, such as surgical incidence records, measurable side effects, etc.

FIG. 13C is thus the results of a categorical response item analysis that is conducted using a Factor Analysis that enables discovery of arrangements between variables present in the data set. It seeks to discover if the observed variables can be explained in terms of a much smaller number of variables or factors. By using factor analysis, the number of factors that influence a set of measured, observed variables, and the strength of the relationship between each factor and each variable can be discovered. In this example, one of the metrics ("Average number of cases per year per provider") for the metric set of the cholecystectomy procedure, has confirmed that the value of 26.33 is the beginning of the high-bound inflection point for this metric, which agrees with the AutoNeural feed-forward neural network algorithm.

The desired outcome of the selection system in FIG. 10 is a machine learning application that is more highly adaptable to different qualities and amounts of data present in the example database in FIG. 1, as it varies between metrics set. By optimizing the machine learning classification approaches utilized, higher confidence levels may be provided against the original literature-based surgical metric targets.

The end result of the competition process between different machine learning algorithms is a dynamic machine learning application which is more adaptive to different data qualities associated with metrics within each metric set for a given procedure. The net result is a reduction of the original 25% of metric targets giving non-aligned target values to less than 5% for a given metric set. This number of non-aligned targets may be reduced even further with additional data being provided to the application 140 in FIG. 9 from new sources such as hospital and insurance networks.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various examples known to the applicant at this time of filing the application has been presented and is intended for the purposes of illustration and description. The present description is not intended to be exhaustive nor limit the invention to the precise form disclosed and many modifications and variations are possible in the light of the above teachings. The examples described serve to explain the principles of the invention and its practical application and to enable others skilled in the art to utilize the invention in various examples and with various modifications as are suited to the particular use contemplated. Therefore, it is intended that the invention not be limited to the particular embodiments disclosed for carrying out the invention.

While particular examples of the present invention have been shown and described, it will be obvious to those skilled in the art that, based upon the teachings herein, changes and modifications may be made without departing from this invention and its broader aspects. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

What is claimed is:

1. A method of optimizing target metric classifications for a medical procedure using a competitive scoring model to select a machine learning model among a plurality of machine learning models, the method comprising:
   populating a database with input data related to health care provider quality metrics, input data related to health care facility quality metrics, or input data related to both health care provider quality metrics and health care facility quality metrics;
   selecting a medical procedure;
   providing a plurality of target metrics for the selected medical procedure, each of the plurality of target metrics being one of the health care provider quality metrics or one of the health care facility quality metrics;
   determining an ideal metric value for each of the plurality of target metrics, each ideal metric value being associated with a successful medical outcome of the selected medical procedure;

generating a new metric value for each of the plurality of target metrics for the selected medical procedure using each one of a plurality of machine learning models executed on a processor based on a model training set of data in the database, wherein each one of the plurality of machine learning models is executed in parallel for each of the plurality of target metrics to generate the new metric value to compete against each other to compensate for one or more deficiencies in a particular one of the plurality of machine learning models, and wherein at least one of the plurality of machine learning models include an input layer, one or more hidden layers and an output layer with each of the one or more hidden layers having a plurality of nodes that are connected to the input layer, the output layer, or at least one other hidden layer of the one or more hidden layers;

determining an aggregate score for each distinct combination of (i) one machine learning model of the plurality of machine learning models and (ii) one target metric of the plurality of target metrics, the determination of each aggregate score including (i) performing a plurality of validation tests for the distinct combination of the one machine learning model and the one target metric, each of the plurality of validation tests being a distinct technique for measuring an accuracy of the one machine learning model in the generation of the new metric value of the one target metric, and (ii) adding together a distinct value produced by each of the plurality of validation tests, each aggregate score describing an overall accuracy of each of the plurality of machine learning models in matching the generated new metric values to the ideal metric values;

selecting a first one of the plurality of machine learning models for a first one of the plurality of target metrics, based on the determined aggregate score for each of the plurality of machine learning models and the first one of the plurality of target metrics, the selected first one of the plurality of machine learning models having a lowest aggregate score for the first one of the plurality of target metrics across all of the plurality of machine learning models;

selecting a second one of the plurality of machine learning models for a second one of the plurality of target metrics, based on the determined aggregate score for each of the plurality of machine learning models and the second one of the plurality of target metrics, the selected second one of the plurality of machine learning models having a lowest aggregate score for the second one of the plurality of target metrics across all of the plurality of machine learning models, wherein a number of the plurality of machine learning models are selected based on a number of the plurality of target metrics;

executing the first one of the plurality of machine learning models based on the database when the medical procedure is selected to determine a current value of the first one of the plurality of target metrics; and executing the second one of the plurality of machine learning models based on the database when the medical procedure is selected to determine a current value of the second one of the plurality of target metrics.

2. The method of claim 1, wherein the plurality of machine learning models includes a neural feedforward network, a memory based reasoning algorithm, a regression algorithm, a partial least square algorithm, a CHAID decision tree algorithm, a neural network with gradient boosting algorithm, a data mining neural network with adaptive non-linear functionality, a partial least angle regression algorithm, and a neural network.

3. The method of claim 1, wherein the plurality of validation tests includes a maximum absolute error.

4. The method of claim 1, wherein the plurality of validation tests includes an average squared error.

5. The method of claim 1, wherein the generated new metric values for each of the plurality of target metrics by each of the plurality of machine learning models are stored in the database.

6. The method of claim 1, wherein the input data includes patient-based data.

7. The method of claim 1, wherein the ideal metric value for each of the target metrics is derived from statistical backed medical outcome research.

8. The system of claim 1, wherein the input data includes health care provider cost data and health care facility cost data.

9. The method of claim 1, further comprising:
provide a plurality of target metrics for an additional medical procedure that are each a health care provider quality metric or a health care facility quality metric;
determining an ideal metric value for each of the plurality of target metrics for the additional medical procedure;
generating new metric values for the plurality of target metrics for the additional medical procedure using each one of the plurality of machine learning models executed on a processor based on the model training set of data in the database; and
selecting one of the plurality of machine learning models for each target metric based on a comparison between the new target metric values and the ideal metric values for association with the additional medical procedure.

10. A medical analytical system for optimizing target metric classifications for a medical procedure using a competitive scoring model to select a machine learning model among a plurality of machine learning models, the system comprising:
a user interface accepting a selection of the medical procedure;
a database including input data related to health care provider quality metrics, input data related to health care facility quality metrics, or input data related to both health care provider quality metrics and health care facility quality metrics; and
a processor operative to:
provide a plurality of target metrics for the medical procedure, each of the plurality of target metrics being one of the health care provider quality metrics or one of the health care facility quality metrics;
determining an ideal metric value for each of the plurality of target metrics, each ideal metric value being associated with a successful medical outcome of the medical procedure;
generate new metric values for each of a plurality of target metrics for the medical procedure using each one of a plurality of machine learning models executed on a processor based on a model training set of data in the database, wherein each one of the plurality of machine learning models is executed in parallel for each of the plurality of target metrics to generate the new metric value to compete against each other to compensate for one or more deficiencies in a particular one of the plurality of machine learning models, and wherein at least one of the plurality of machine learning models include an input layer, one or more hidden layers and an output layer with each of the one or more hidden layers having a plurality of nodes that are connected to the input layer, the output layer, or at least one other hidden layer of the one or more hidden layers;

determine an aggregate score for each distinct combination of (i) one machine learning model of the plurality of machine learning models and (ii) one target metric of the plurality of target metrics, the determination of each aggregate score including (i) performing a plurality of validation tests for the distinct combination of the one machine learning model and the one target metric, each of the plurality of validation tests being a distinct technique for measuring an accuracy of the one machine learning model in the generation of the new metric value of the one target metric, and (ii) adding together a distinct value produced by each of the plurality of validation, each aggregate score describing an overall accuracy of each of the plurality of machine learning models in matching the generated new metric values to the ideal metric values;

select a first one of the plurality of machine learning models for a first target metric, based on the determined aggregate score for each of the plurality of machine learning models and the first target metric, the selected first one of the plurality of machine learning models having a lowest aggregate score for the first one of the plurality of target metrics across all of the plurality of machine learning models;

select a second one of the plurality of machine learning models for a second target metric, based on the determined aggregate score for each of the plurality of machine learning models and the second target metric, the selected second one of the plurality of machine learning models having a lowest aggregate score for the second one of the plurality of target metrics across all of the plurality of machine learning models, wherein a number of the plurality of machine learning models are selected based on a number of the plurality of target metrics; and execute the first one of the plurality of machine learning models and the second one of the plurality of machine learning models based on the database when the medical procedure is selected to determine a current value of the first target metric and a current value of the second target metric.

11. The method of claim 1, wherein the plurality of validation tests includes an average squared error, a model degrees of freedom, Akaike's Information Criterion, a maximum absolute error, and a root average squared error.

12. The method of claim 1, wherein the first one of the plurality of machine learning models has the lowest aggregate score for the first one of the plurality of target metrics, and does not have the lowest aggregate score for the second one of the plurality of target metrics.

13. The method of claim 12, wherein the second one of the plurality of machine learning models has the lowest aggregate score for the second one of the plurality of target metrics, and does not have the lowest aggregate score for the first one of the plurality of target metrics.

14. The method of claim 1, further comprising selecting a health care provider for the medical procedure based on both the current value of the first one of the plurality of target metrics and the current value of the second one of the plurality of target metrics.

15. The method of claim 12, wherein the first one of the plurality of machine learning models has the least amount of random effects present in the generation of the new metric value for the first one of the plurality of target metrics, and does not have the least amount of random effects present in the generation of the new metric value for the second one of the plurality of target metrics.

16. The method of claim 13, wherein the second one of the plurality of machine learning models has the least amount of random effects present in the generation of the new metric value for the second one of the plurality of target metrics, and does not have the least amount of random effects present in the generation of the new metric value for the first one of the plurality of target metrics.

* * * * *